(12) United States Patent
Sung et al.

(10) Patent No.: US 11,582,814 B2
(45) Date of Patent: *Feb. 14, 2023

(54) METHODS AND SYSTEMS FOR TRANSMITTING AND RECEIVING DATA THROUGH ONE OR MORE TUNNELS FOR PACKETS SATISFYING ONE OR MORE CONDITIONS

(71) Applicant: Pismo Labs Technology Limited, Kowloon (HK)

(72) Inventors: Patrick Ho Wai Sung, Kowloon (HK); Kit Wai Chau, Kowloon (HK); Kam Chiu Ng, New Territories (HK); Wan Chun Leung, New Territories (HK); Ying Kwan, New Territories (HK); Martin Langmaid, Exeter (GB)

(73) Assignee: Pismo Labs Technology Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,006

(22) Filed: Jul. 20, 2020

(65) Prior Publication Data

US 2020/0351961 A1 Nov. 5, 2020

Related U.S. Application Data

(63) Continuation of application No. 15/894,677, filed on Feb. 12, 2018, now Pat. No. 10,721,783, which is a (Continued)

(51) Int. Cl.
*H04W 76/12* (2018.01)
*H04L 12/46* (2006.01)
(Continued)

(52) U.S. Cl.
CPC ........ *H04W 76/12* (2018.02); *H04B 7/18589* (2013.01); *H04L 12/4633* (2013.01); *H04L 45/10* (2013.01); *H04W 28/0215* (2013.01)

(58) Field of Classification Search
None
See application file for complete search history.

(56) References Cited

U.S. PATENT DOCUMENTS 6,484,210 B1  11/2002  Adriano
7,107,613 B1   9/2006  Chen
(Continued)

FOREIGN PATENT DOCUMENTS

CN   1219054 A   6/1999
CN   1747353 A   3/2006
(Continued)

OTHER PUBLICATIONS

International Search Report in International Application No. PCT/IB2014/062580, dated Mar. 25, 2015.
(Continued)

*Primary Examiner* — Alpus Hsu
*Assistant Examiner* — Camquyen Thai
(74) *Attorney, Agent, or Firm* — Hershkovitz & Associates, PLLC; Abe Hershkovitz

(57) ABSTRACT

A method and system for a first node to transmit packets to a second none, comprising receiving a packet from a local area network (LAN) interface, inspecting the packet; determining whether the packet satisfies at least one packet condition; transmitting the packet through a predefined tunnel if the packet satisfies the at least one packet condition; transmitting the packet through a second tunnel if the packet does not satisfy the at least one packet condition. The predefined tunnel is a first tunnel and is established before the packet is received by the first node. The second tunnel
(Continued)

belongs to a first tunnel group or a second tunnel group. The first tunnel, the second tunnel and other tunnels may together form an aggregated connection. Further, the use of predefined tunnel may be based on whether the packets satisfy a session condition.

18 Claims, 15 Drawing Sheets

Related U.S. Application Data continuation of application No. 14/410,098, filed as application No. PCT/IB2014/062580 on Jun. 25, 2014, now Pat. No. 9,894,694.

(51) Int. Cl.
    *H04B 7/185*     (2006.01)
    *H04L 45/02*     (2022.01)
    *H04W 28/02*     (2009.01)

(56) References Cited

U.S. PATENT DOCUMENTS

| | | | |
|---|---|---|---|
| 7,360,243 B2 | 4/2008 | Krtolica | |
| 8,218,498 B2 | 7/2012 | Jeong | |
| 9,019,827 B1 | 4/2015 | Chan | |
| 9,264,972 B2 | 2/2016 | Fan | |
| 2002/0026503 A1 | 2/2002 | Bendinelli | |
| 2003/0050008 A1 | 3/2003 | Patterson | |
| 2004/0177157 A1 | 9/2004 | Mistry | |
| 2004/0236855 A1 | 11/2004 | Peles | |
| 2004/0267959 A1 | 12/2004 | Cochran | |
| 2005/0033990 A1 | 2/2005 | Harvey | |
| 2005/0076234 A1 | 4/2005 | Krtolica | |
| 2006/0050736 A1 | 3/2006 | Segel | |
| 2006/0209768 A1* | 9/2006 | Yan | H04W 72/04 370/338 |
| 2007/0147397 A1* | 6/2007 | Aaron | H04L 63/0272 370/401 |
| 2008/0069024 A1* | 3/2008 | Iino | H04W 48/12 370/313 |
| 2008/0112421 A1 | 5/2008 | Krtolica | |
| 2008/0192701 A1 | 8/2008 | Jeong | |
| 2008/0304456 A1 | 12/2008 | Iino | |
| 2009/0067400 A1* | 3/2009 | Binet | H04L 12/4633 370/338 |
| 2009/0073979 A1 | 3/2009 | He | |
| 2009/0122990 A1* | 5/2009 | Gundavelli | H04L 63/164 380/278 |
| 2009/0170475 A1 | 7/2009 | Ch'ng | |
| 2009/0313690 A1* | 12/2009 | Bichot | H04L 47/125 726/12 |
| 2010/0020753 A1* | 1/2010 | Fulknier | H04L 45/24 370/329 |
| 2010/0075659 A1* | 3/2010 | Kim | H04W 76/11 455/422.1 |
| 2010/0150049 A1* | 6/2010 | Kim | H04W 76/12 370/312 |
| 2012/0287844 A1 | 11/2012 | Ophir | |
| 2012/0307659 A1 | 12/2012 | Yamada | |
| 2013/0077482 A1 | 3/2013 | Krishna | |
| 2013/0179605 A1 | 7/2013 | Huang | |
| 2013/0287038 A1 | 10/2013 | Zhou | |
| 2013/0322255 A1 | 12/2013 | Dillon | |
| 2013/0329714 A1 | 12/2013 | Fan | |
| 2014/0086177 A1 | 3/2014 | Adjakple | |
| 2014/0199963 A1* | 7/2014 | Mohebbi | H04W 12/069 455/410 |
| 2014/0313989 A1* | 10/2014 | Doken | H04N 21/64769 370/329 |
| 2015/0009991 A1 | 1/2015 | Sung | |
| 2015/0263865 A1* | 9/2015 | Rangarajan | H04L 63/20 370/254 |
| 2015/0309894 A1 | 10/2015 | Zhou | |

FOREIGN PATENT DOCUMENTS

| | | |
|---|---|---|
| CN | 101047541 A | 10/2007 |
| CN | 101115131 A | 1/2008 |
| CN | 101185296 A | 5/2008 |
| CN | 201114131 Y | 9/2008 |
| CN | 101635663 A | 1/2010 |
| CN | 101729354 A | 6/2010 |
| CN | 102724055 A | 10/2012 |
| CN | 103560954 A | 2/2014 |
| JP | 2004147344 A | 5/2004 |
| WO | 2009143722 A1 | 12/2009 |

OTHER PUBLICATIONS

Written Opinion of the international Searching Authority in International Application No. PCT/IB2014/062580, dated Mar. 25, 2015.
International Preliminary Report on Patentability Chapter I in International Application No. PCT/IB2014/062580, dated Dec. 27, 2016.
International Search Report in International Application No. PCT/IB2014/059378, dated Dec. 12, 2014.
Written Opinion of the International Searching Authority in International Application No. PCT/IB2014/059378, dated Dec. 12, 2014.
International Preliminary Report on Patentability Chapter I in International Application No. PCT/IB2014/059378, dated Sep. 6, 2016.
Combined Search and Examination Report in UK Application No. GB1418215.8, dated Nov. 16, 2015.
Examination Report in related UK Application No. GB1418215.8, dated May 3, 2016.
Examination Report, in related UK Application No. GB1418215.8, dated Jul. 29, 2016.
First Office Action and Search Report in related Chinese Application No. 201480079776.5, dated Mar. 20, 2019.
First Office Action and Search Report in related Chinese Application No. 201480043845.7, dated Aug. 2, 2018.
English Language Abstract of CN1219054A (Jun. 9, 1999).
English Language Abstract of CN1747353A (Mar. 15, 2006).
English Language Abstract of CN101047541A (Oct. 3, 2007).
English Language Abstract of CN101115131A (Jan. 30, 2008).
English Language Abstract of CN101185296A (May 21, 2008).
English Language Abstract of CN101635663A (Jan. 27, 2010).
English Language Abstract of CN101729354A (Jun. 9, 2010).
English Language Abstract of CN102724055A (Oct. 10, 2012).
English Language Abstract of CN103560954A (Feb. 5, 2014).
English Language Abstract of JP2004147344A (May 20, 2004).
English Language Abstract of CN201114131Y (Sep. 10, 2008).
Examination Report in related UK Application No. GB1517497.2, dated Sep. 24, 2020.
English machine translation of description and claims of WO 2009/143722 A1 (Dec. 3, 2009).

\* cited by examiner

| VPN Profile | | | |
|---|---|---|---|
| Name | Show_ASYM_TUNNEL | | |
| Encryption | ⊙ 256-bit AES     ○ OFF | | |
| Authentication | ⊙ Remote ID / Pre-shared Key     ○ X.509 | | |
| Remote ID/ Pre-shared key | Remote ID | Pre-shared Key | |
| | blah | | ✖ |
| | | | ✚ |
| Allow shared Remote ID | ☐ | | |
| Remote IP Address/ Host Names (Optional) | If this field is empty, this field on the remote unit must be filled | | |

| WAN Connection Priority | | | |
|---|---|---|---|
| 1. WAN 1 | Priority: ------OFF------ ▼ | | |
| 2. WAN 2 | Priority: 1 (Highest) ▼ | Direction: | Up Only ▼ |
| 3. WAN 3 | Priority: 1 (Highest) ▼ | Direction: | Down Only ▼ |
| 4. WAN 4 | Priority: 1 (Highest) ▼ | Direction: | Up/Down ▼ |

Fig. 10

VPN Profile

| Name | Show_ASYM_TUNNEL | | |
|---|---|---|---|
| Encryption | ⦿ 256-bit AES  ○ OFF | | |
| Authentication | ⦿ Remote ID / Pre-shared Key  ○ X.509 | | |
| Remote ID/ Pre-shared key | Remote ID | Pre-shared Key | |
| | blah | | ✖ |
| | | | ✚ |
| Allow shared Remote ID | ☐ | | |
| Remote IP Address/ Host Names (Optional) | If this field is empty, this field on the remote unit must be filled | | |

1111

1101

Tunnel Priority

| 1. Tunnel A | Priority: | -----OFF----- ▼ | | |
|---|---|---|---|---|
| 2. Tunnel B | Priority: | 1 (Highest) ▼ | Direction: | Up Only ▼ |
| 3. Tunnel C | Priority: | 1 (Highest) ▼ | Direction: | Down Only ▼ |
| 4. Tunnel D | Priority: | 1 (Highest) ▼ | Direction: | Up/Down ▼ |

METHODS AND SYSTEMS FOR TRANSMITTING AND RECEIVING DATA THROUGH ONE OR MORE TUNNELS FOR PACKETS SATISFYING ONE OR MORE CONDITIONS

RELATED APPLICATIONS

The present application is a non-provisional Continuation application which claims the benefits of and is based on U.S. application Ser. No. 15/894,677, titled "METHODS AND SYSTEMS FOR TRANSMITTING AND RECEIVING DATA THROUGH ONE OR MORE TUNNELS FOR PACKETS SATISFYING ONE OR MORE CONDITIONS", filed on Feb. 12, 2018, and issued as U.S. Pat. No. 10,721,785 B2 on Jul. 21, 2020, which is a non-provisional Continuation application which claims the benefits of U.S. application Ser. No. 14/410,098, titled "METHODS AND SYSTEMS FOR TRANSMITTING AND RECEIVING DATA THROUGH ONE OR MORE TUNNEL FOR PACKETS SATISFYING ONE OR MORE CONDITIONS", filed on Dec. 21, 2014, and issued as U.S. Pat. No. 9,894,694 B2 on Feb. 13, 2018, which claims the benefits of and is based on PCT application No. PCT/IB2014/062580, filed on Jun. 25, 2014, the disclosures of which are hereby incorporated by specific reference thereto.

TECHNICAL FIELD

The present invention relates in general to the field of computer networks. More particularly, the present invention relates to a method carried out by a first node for transmitting data to a second node mainly through a first tunnel group and receiving data from the second node mainly through a second tunnel group.

BACKGROUND ART

Internet service providers can provide satellite Internet service to users through geostationary satellites which may offer high data throughput. In addition to the high throughput, the coverage area of satellite networks is also very big compared to other wireless networks that may be available in recent times. Satellite networks often provide coverage in many rural areas where other wireless networks may not be available. However, satellite communications have higher latencies compared to other wireless communications due the data having to travel long distances to the geostationary satellite. Although satellite communications provide very high performance for downlink data, performance of communications through satellite may not be satisfactory for uplink data, especially if uplink is done from many devices at once, i.e. from customers of the Internet service providers. The paper titled "Networking using Direct Broadcast Satellite" (Venkata Padmanabhan, Hari Balakrishnan, Keith Sklower, Elan Amir, and Randy H. Katz. Networking using Direct Broadcast Satellite. In Proc. of the 1st international Workshop on Satellite-based Services, Rye, New-York, November 1996. University of California at Berkeley) presents a networking architecture where a geostationary satellite broadcasts directly to user premises, while outgoing traffic from the user premises to the Internet is sent over an SLIP/PPP line. This paper explains in detail an asymmetric routing technology. There are two options for sending packets from the users to the Internet. In the first option, packets are encapsulated and sent over the SLIP line using DBS source address. In the second option, home agent-based routing is used.

Users may enjoy high downlink bandwidth when accessing the Internet through a satellite network. However, for transmitting packets to a host or node accessible through the internet, using wireless networks other than a satellite network may provide lower latency and may be cost effective. For a data session using a connection-oriented protocol, techniques are required for automatically enabling a user to use a satellite network for downlink and another wireless or wired network for uplink, while taking into account the asymmetric bandwidth and asymmetric latency.

SUMMARY

The embodiments of the present invention describe, in general, a first node and a second node communicating with each other through one or more tunnels.

According to one of the embodiments of the present invention, a first node receives a packet from a local area network (LAN) interface and inspects the packet. The first node then determines whether the packet satisfies at least one packet condition. If the packet satisfies the at least one packet condition, the first node transmits the packet through a first tunnel. If the packet does not satisfy the at least one packet condition, the first node transmits the packet through a second tunnel.

According to one of the embodiments of the present invention, the first tunnel is a predefined tunnel that is established before the first node receives the packet.

According to one of the embodiments of the present invention, the first tunnel is unidirectional.

According to one of the embodiments of the present invention, the first node determines whether a packet belongs to any session after inspecting the packet. If the packet does not belong to any session, the first node determines whether the packet satisfies the at least one packet condition, and transmits the packet through a first tunnel if the packet satisfies the at least one packet condition, and through a second tunnel if the packet does not satisfy the at least one packet condition. If the packet does belong to a session, the first node determines whether an assigned tunnel has been assigned for the session. The first node transmits the packet through the assigned tunnel if an assigned tunnel has been assigned for the session. If no assigned tunnel is assigned for the session, the first node determines whether the session satisfies at least one session condition. The first node transmits the packet through a third tunnel if the session satisfies the at least one session condition. If the session does not satisfy the at least one session condition, the first node transmits the packet through a fourth tunnel.

According to one of the embodiments of the present invention, the third tunnel is a predefined tunnel. The third tunnel may be established before the first node receives the packet.

According to one of the embodiments of the present invention, the first tunnel is the same as the third tunnel.

According to one of the embodiments of the present invention, the third tunnel is unidirectional.

According to one of the embodiments of the present invention, the fourth tunnel belongs to a first tunnel group or a second tunnel group. Similarly, the third tunnel also belongs to the first tunnel group or the second tunnel group.

The details of one or more embodiments of the invention are set forth in the accompanying drawings and the descrip-

BRIEF DESCRIPTION OF DRAWINGS

FIG. 10 illustrates a webpage used to configure a first node according to one of the embodiments of the present invention.

FIG. 11 illustrates a webpage used to configure a first node according to one of the embodiments of the present invention.

DETAILED DESCRIPTION

Figure 1:
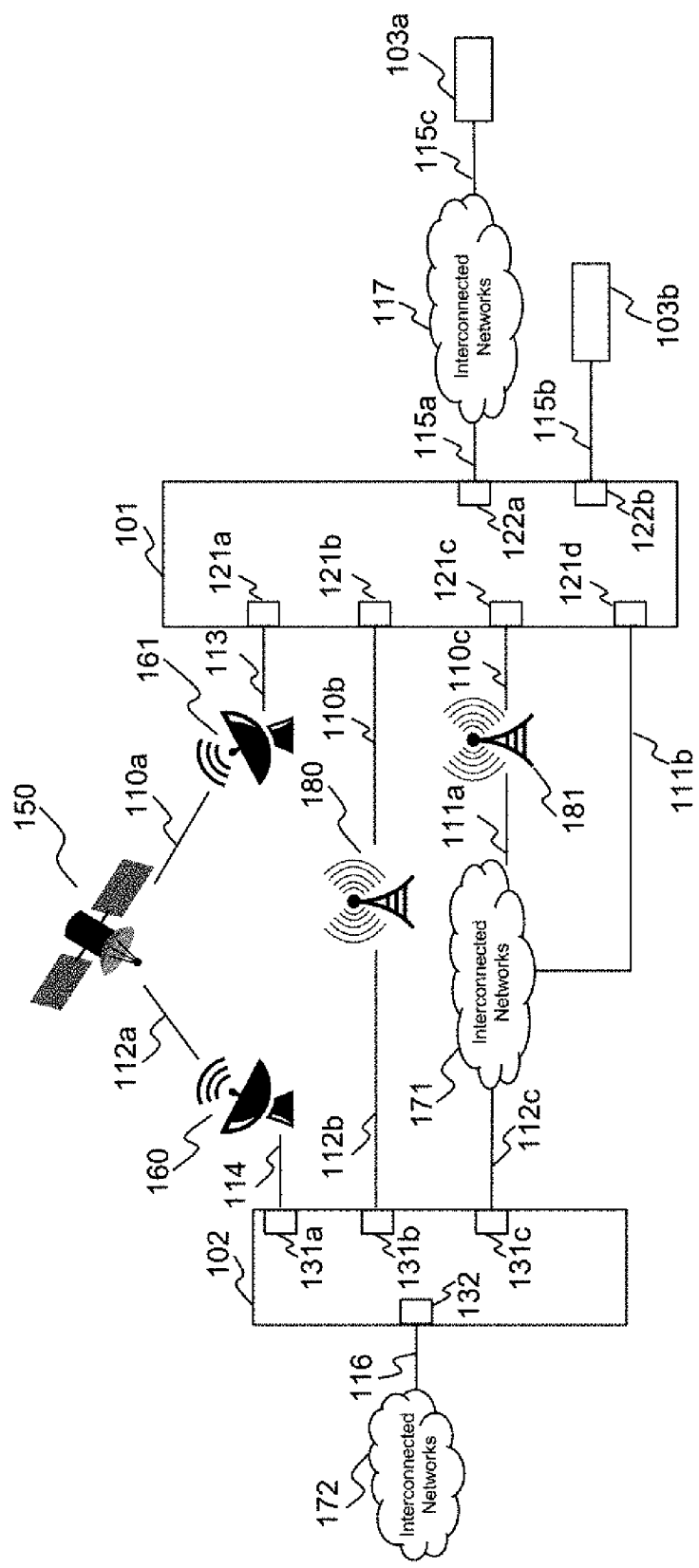
FIG. 1 illustrates a network configuration according to various embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a computer readable storage medium.

Moreover, as disclosed herein, the term "computer readable storage medium", "main memory", or "secondary storage" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "computer readable storage media" may also include, but is not limited to portable or fixed storage devices, optical storage mediums, magnetic mediums, memory chips or cartridges, wireless channels and various other mediums capable of storing, containing or carrying instruction(s) and/or data. A computer readable storage medium can be realized by virtualization, and can be a virtual computer readable storage medium including a virtual computer readable storage medium in a cloud-based instance.

The term "computer readable storage media", "main memory", or "secondary storage", as used herein refers to any medium that participates in providing instructions to a processing unit for execution. The main memory or secondary storage is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by the processing unit. A non-volatile storage or static storage may be used for storing static information and instructions for the processing unit, as well as various system configuration parameters.

The computer readable storage medium may include a number of software modules that may be implemented as software code to be executed by the processing unit using any suitable computer instruction type. The software code may be stored as a series of instructions or commands, or as a program in the computer readable storage medium.

Various forms of computer readable storage media may be involved in carrying one or more sequences of one or more instructions to the processing unit for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer readable storage medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A presently preferred embodiment of the present invention may utilize a gateway. A gateway is a device which performs protocol conversion between different types of networks or applications. The term gateway is not meant to be limited to a single type of device, as any device, hardware or software, that may act as a bridge between the user and the networks may be considered a gateway for purposes of this application. The gateway may couple with a plurality of multiple networks. A router, an access point or a wireless access point may all be considered a gateway for purposes of this invention.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

Figure 3:
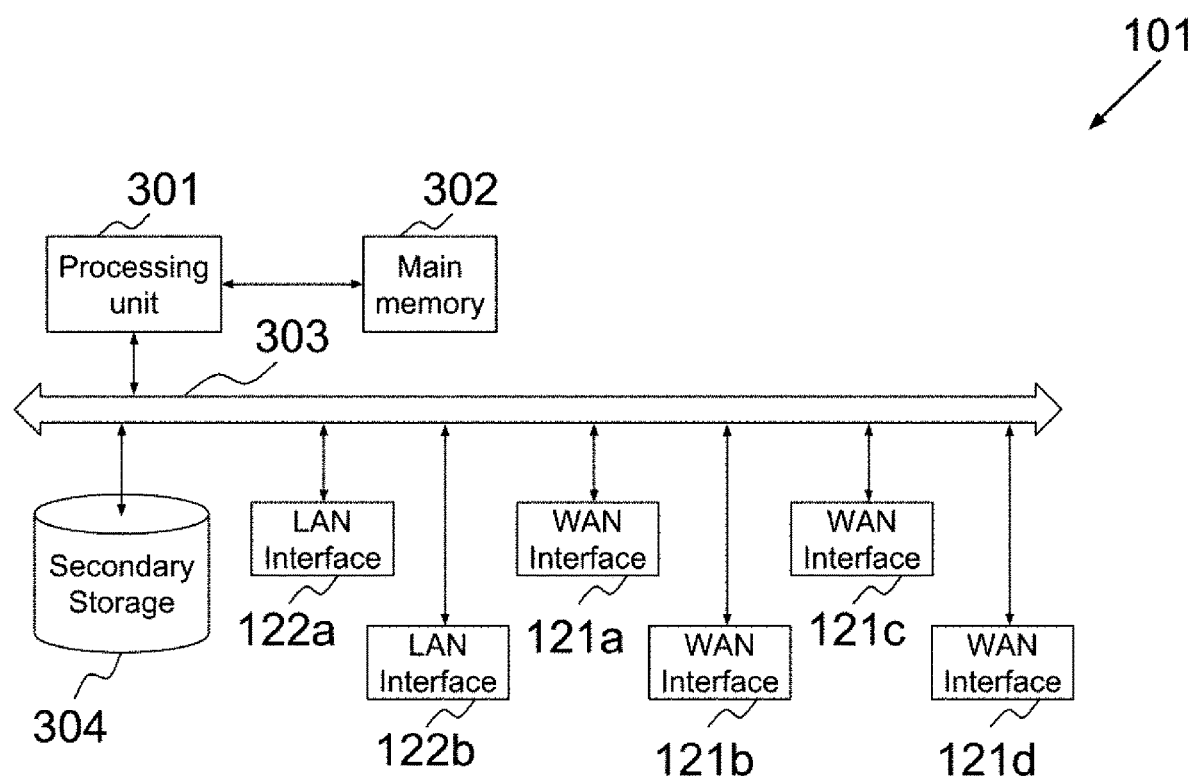
FIG. 3 is an illustrative block diagram of a computer system or network node according to one of the embodiments of the present invention.

FIG. 3 is an illustrative block diagram of a computer system or network node, such as node 101, according to one of the embodiments of the present invention. Node 101 comprises processing unit 301, main memory 302, system bus 303, secondary storage 304, local area network (LAN) interfaces 122a and 122b, and wide area network (WAN) interfaces 121a, 121b, and 121c. Secondary storage 304 and main memory 302 are computer readable storage media. Processing unit 301 and main memory 302 are connected to each other directly. System bus 303 connects processing unit 301 directly or indirectly to secondary storage 304, LAN interfaces 122a and 122b, and WAN interfaces 121a, 121b, 121c, and 121d. Using system bus 303 allows node 101 to have increased modularity. System bus 303 couples processing unit 301 to secondary storage 304, and LAN interfaces 122a and 122b, and WAN interfaces 121a, 121b, 121c, and 121d. System bus 303 can be any of several types of bus structures including a memory bus, a peripheral bus, and a local bus using any of a variety of bus architectures. Secondary storage 304 stores program instructions for execution by processing unit 301. The scope of the invention is not limited to node 101 having five network interfaces, such that node 101 may have more network interfaces. LAN interfaces 122a and 122b, and WAN interfaces 121a, 121b, 121c, and 121d are specified for illustration purposes only.

Figure 4:
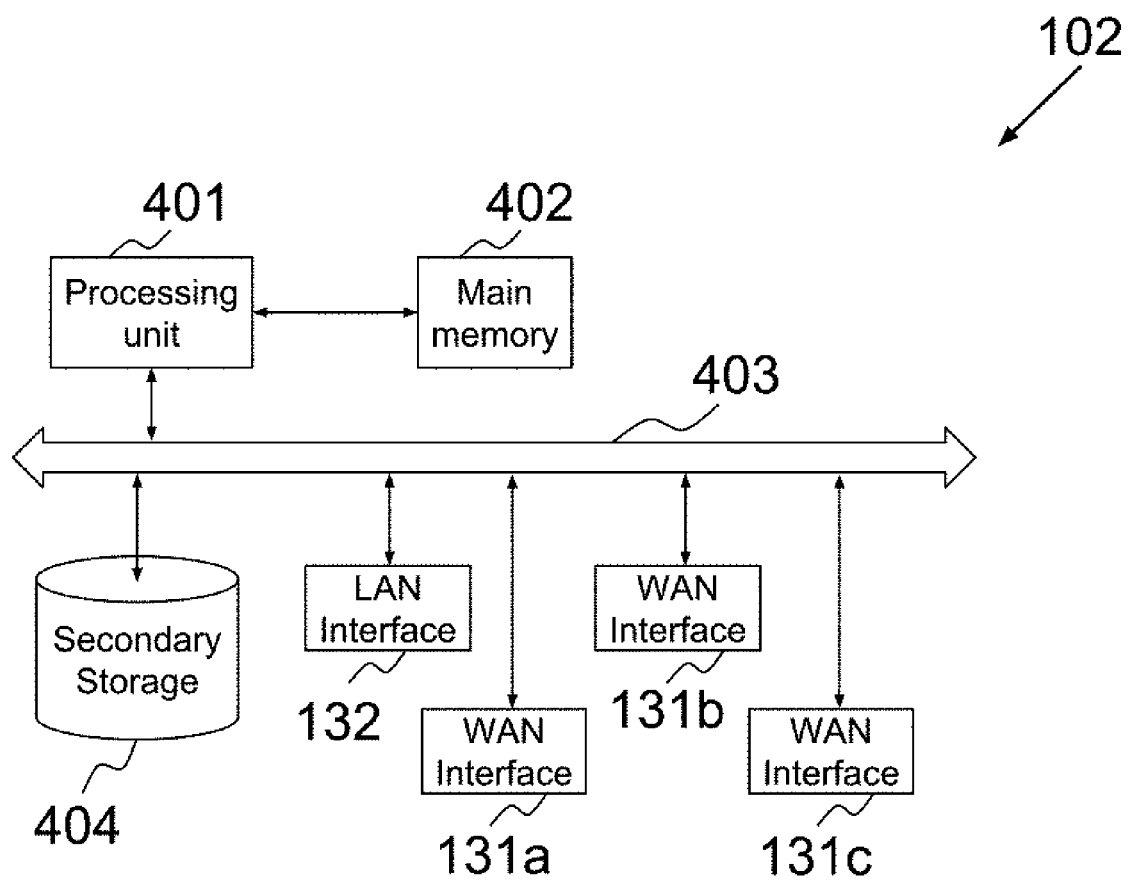
FIG. 4 is an illustrative block diagram of a computer system or network node according to one of the embodiments of the present invention.

FIG. 4 is illustrative block diagram of a computer system or network node, such as node 102, according to one of the embodiments of the present invention. Node 102 comprises processing unit 401, main memory 402, system bus 403, secondary storage 404, LAN interface 132, WAN interfaces 131a, 131b, and 131c. The components of node 102 are connected to each other in a similar way as the components of node 101.

Figure 5:
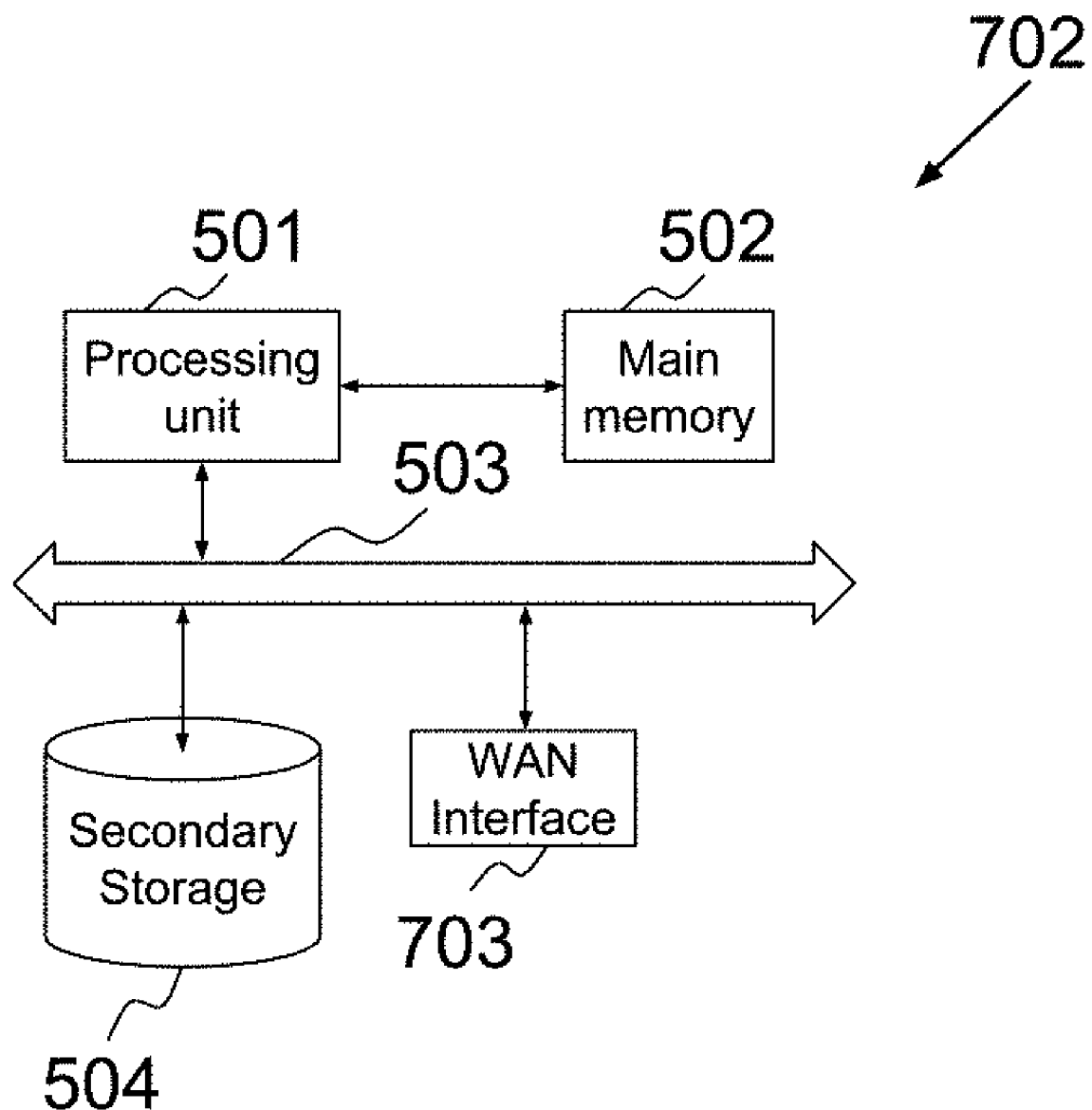
FIG. 5 is an illustrative block diagram of a computer system or network node according to one of the embodiments of the present invention.

FIG. 5 is illustrative block diagram of a computer system or network node, such as node 702, according to one of the embodiments of the present invention. Node 702 comprises processing unit 501, main memory 502, system bus 503, secondary storage 504, and WAN interface 703. The components of node 702 are connected to each other in a similar way as the components of node 101. Alternatively, node 702 may also be represented by the block diagram in FIG. 3 or FIG. 4, such that node 702 may have one or more WAN interfaces, and one or more LAN interfaces.

Figure 2:
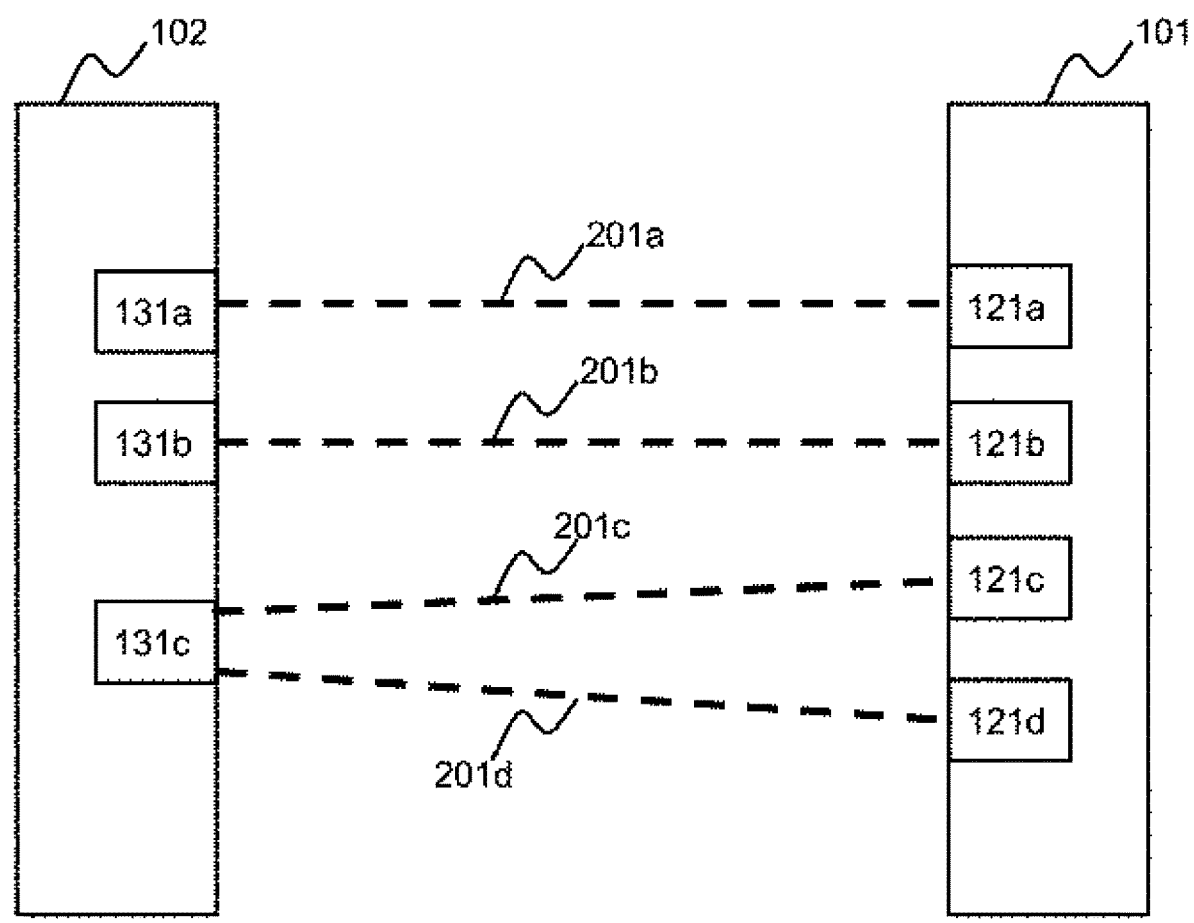
FIG. 2 illustrates tunnels established between a first node and a second node according to various embodiments of the present invention.

FIG. 1 illustrates a network configuration according to various embodiments of the present invention. Node 101 is connected to node 102 through four tunnels: tunnels 201a, 201b, 201c and 201d illustrated in FIG. 2. LAN interface 122a connects node 101 to host 103a through interconnected networks 117 using connections 115a and 115c. LAN interface 122b connects node 101 to host 103b using connection 115b.

For illustration purpose, node 101 connects to a satellite network through WAN interface 121a for establishing tunnel 201a with node 102. WAN interface 121a communicates with satellite network 150 by using satellite modem 161; node 102 connects to satellite network 150 through WAN interface 131a and satellite modem 160 for establishing tunnel 201a with node 101.

The connection between WAN interface 121a and satellite network 150 and the connection between WAN interface 131a and satellite network 150 are using satellite modems 160 and 161 respectively. Satellite modems 160 and 161 may have embedded antenna or external antenna used for communicating with satellite network 150 through connections 112a and 110a respectively. WAN interfaces 131a and 121a connect to satellite modems 160 and 161 respectively through wired or wireless connection medium 114 and 113 respectively. Preferably connection medium 114 and 113 are fast-speed wired connection medium, such as a computer bus, Universal Serial Bus (USB), serial bus, parallel bus, fiber optics, FireWire, Thunderbolt, and etc. Satellite modem 160 can also be included within a housing that contains node 102, and satellite modem 161 can be included within a housing that contains node 101. Alternatively, node 102 can include an auxiliary port into which satellite modem 160 is plugged. Satellite modems 160 and 161 are configured to transmit and receive communications to and from satellite network 150. Satellite modems 160 and 161 may be selected from any number of available satellite modems, including but not limited to: Quake Global; Comtech EF Data; Datum Systems; Hughes Network Systems; Newtec; Paradise Datacom; Radyne ComStream; Shiron Satellite Communications; AdvantechAMT (formerly Signal Processors, SPL/ACT, ACT Wireless); and TSI Technology.

Also for illustration purpose, node 101 establishes tunnel 201b with node 102 through WAN interface 121b, wireless network 180 and WAN interface 131b. WAN interface 121b communicates with wireless network 180 through a wireless communication channel 110b. Similarly WAN interface 131b communicates with wireless network 180 through wireless communication channel 112b. Communication through wireless communication channel 110b and 112b can be realized through a wireless modem or a cellular modem. The size of wireless network 180 is not limited. For example, wireless network 180 may be a cellular network operated by Verizon, ATT, China Mobile, or Vodafone. A cellular network can also be a mobile virtual network operator (MVNO) or mobile other licensed operator (MOLO) that provides a wireless communications services but does not own the wireless or cellular network infrastructure over which the MVNO provides services to its customers.

Also for illustration purpose, node 101 establishes tunnel 201c with node 102 through WAN interface 121c, wireless network 181, interconnected network 171 and WAN interface 131c. WAN interface 121c communicates with wireless network 181 through wireless communication channel 110c. Wireless network 181 communicates with WAN interface 131c through interconnected networks 171. The size of wireless network 181 is also not limited. For example, wireless network 181 may be a cellular network operated by Verizon, AT&T, China Mobile, or Vodafone. Wireless network 181 and interconnected networks 171 communicate with each other through connection 111a. Node 102 communicates with interconnected networks 171 through connection 112c.

Wireless networks 180 and 181 are preferably configured for wireless digital transfer using a suitable digital data transfer protocol such as High Speed Downlink Packet Access (HSDPA) and High-Speed Uplink Packet Access (HSUPA), Code Division Multiple Access (CDMA), Evolution-Data Optimized (EVDO), Enhanced Data Rates for GSM Evolution (EDGE), General Packet Radio Service (GPRS) Third Generation Partnership Program Long Term Evolution (3GPP LTE) or any other digital data transfer protocol for wireless data transfer over radio, microwave or frequency bands used in wireless networks. In one variant, wireless networks 180 and 181 are configured for wireless digital transfer using Worldwide Interoperability for Microwave Access (WiMAX), Local Multipoint Distribution Service (LMDS), Multichannel Multipoint Distribution Service (MMDS), IEEE 802.11 technologies, such as IEEE 802.11a, IEEE 802.11b, IEEE 802.11g, IEEE 802.11n, IEEE 802.11ac, and/or IEEE 802.11ad.

WAN interfaces 121b, 121c and 131b can be realized by using a connection through cellular phones, cellular modems, and/or wireless communication modems. A cellular modem, such as a 3GPP LTE modem, is capable of communicating with one or more cellular networks. A cellular modem can be an embedded cellular modem or an external cellular modem.

Connections 110a, 112a, 112c, 111a, 111b, 115a, 115b, and 116 can be realized by using any type of wired or wireless connection medium. For example, wired connection mediums may include Ethernet, fiber channel, digital subscriber loop, cable modem, frame relay, token ring, serial bus, USB, Firewire, PCI, etc. Wireless connection mediums may include a wireless link such as Wi-Fi™, a wireless connection using a wireless communication protocol such as IEEE 802.11 (wireless Ethernet), Bluetooth, etc.

Interconnected networks 117, 171, and 172 can be public interconnected network, such as the Internet, private interconnected network or hybrid public and private interconnected networks. For example, both interconnected networks 117 and 172 can be local area networks (LAN) connected together through tunnels 201a, 201b, 201c and 201d. In another example, interconnected networks 117 is a LAN and interconnected networks 172 is the Internet, such that node 102 performs as a gateway for interconnected networks 117 to communicate with the Internet through at least of the tunnel of tunnels 201a, 201b, 201c and 201d.

A tunnel, such as tunnels 201a, 201b, 201c and 201d, is established between two networks. Through a tunnel, hosts from two different networks can communicate as in the same network, such as in the same IP subnet. The tunnels, for example, can be implemented using Secure Sockets Layer (SSL), L2TP, Internet Protocol Security (IPSec) and SSL, IPSec and Layer 2 Tunneling Protocol (L2TP) or Point-to-Point Tunneling Protocol (PPTP). One or more tunnels can be established between two network interfaces, such as WAN interface 121c and 131c. Therefore, there could be more than the four tunnels, i.e. tunnels 201a, 201b, 201c and 201d, to be established between node 101 and node 102. For example, WAN interface 121b may also establish another tunnel with WAN interface 131c if wireless networks 180 can communicate with interconnected networks 171.

Data can be in stored in payload of data packets. Node 101 encapsulates data packets in encapsulating packets, and then transmits encapsulating packets to node 102 through one or more tunnels. When node 102 receives the encapsulating packets, node 102 decapsulates the encapsulating packets to retrieve the data packets. Encapsulating packets may be distributed among the plurality of tunnels, i.e. tunnels 201a, 201b, 201c and 201d.

Similarly, when node 102 needs to transmit data packets to node 101, node 102 first encapsulates data packets in encapsulating packets, and then transmits encapsulating packets to node 101 through the one or more tunnels. When node 101 receives the encapsulating packets, node 101 decapsulates the encapsulating packets to retrieve the data packets.

Those who are skilled in the arts would appreciate that a tunnel enables the encapsulation of data from one type of protocol within the datagram of the same or different protocol. Those who are skilled in the arts would also appreciate that tunnels can be used to implement virtual private networks (VPN). In one variant, the tunnels between node 101 and 102 are aggregated to form an aggregated tunnel or an aggregated VPN connection. For example, tunnels 201a, 201b and 201c are aggregated to form one aggregated VPN connection. The aggregated VPN connection allows, for example, data packets belonging to one TCP session are transmitted and received through tunnels 201a, 201b and 201c to take advantage of the availability of the networks connecting to WAN interfaces 121a, 121b and 121c.

Those who are skilled in the arts would appreciate that there are many methods to aggregate a plurality of tunnels to form one aggregated tunnel or connection. One of the methods is disclosed in the U.S. patent application Ser. No. 12/646,774, Filed Dec. 23, 2009, entitled "THROUGHPUT OPTIMIZATION FOR BONDED VARIABLE BANDWIDTH CONNECTIONS".

According to one of the embodiments of the present invention, when a first node forms at least two tunnel groups with a second node, one of the tunnel groups is mainly used to transmit data packets from the first node to the second node and another tunnel group is mainly used to receive data packets from the second node. In each tunnel group, there can be one or more tunnels. As there are at least two tunnel groups and each tunnel group has at least one tunnel, there are at least two tunnels established between the first node and the second node. The at least two tunnels are established through two of network interfaces of the first node and at least one network interface of the second node. In one variant, the second node may perform as a gateway for the first node. In one variant, when a tunnel group is mainly used to transmit data packets from the first node to the second node, there is no data packet being transmitted from the second node to the first node through the tunnel group. In one variant, when a tunnel group is mainly used to transmit data packets from the first node to the second node, there is a small number of packets being transmitted from the second node to the first node through the tunnel group as those packets are used for managing the tunnel group, such as transmitting health check packets, establishing one of the tunnels in the tunnel group and sending status information. In one variant, when a tunnel group is mainly used to receive data packets by the first node from the second node, there is no data packet being transmitted by the first node to the second node through the tunnel group. In one variant, when a tunnel group is mainly used to receive data packets by the first node from the second node, there is a small number of packets being transmitted from the first node to the second node through the tunnel group as those packets are used for managing the tunnel group, such as transmitting health check packets, establishing one of the tunnels in the tunnel group and sending status information.

For illustration purpose, the first node is node 101 and the second node is node 102; a first tunnel group comprises tunnels 201b and 201c; and a second tunnel group comprises tunnels 201a and 201d. The first tunnel group is used to transmit data packets from node 101 to node 102 while the second tunnel group is used to transmit data packets from node 102 to node 101 Therefore node 102 may perform as a gateway for node 101 and the networks connected to the node 101, such as network 117, host 103a and hosts 103b, to communicate with interconnected network 172. Furthermore, as the number of tunnels in the first tunnel group can be more than one, node 101 may use a plurality of tunnels in the first tunnel group to transmit data packets to node 102. When node 102 receives the data packets through one or more tunnels of the first tunnel group, node 102 reorders the packets before transmitting the packets to interconnected network 172 if necessary. Similarly, in another example, as the number of tunnels in the second tunnel group can be more than one, node 102 may use a plurality of tunnels in the second tunnel group to transmit data packets to node 101. When a host in interconnected networks 172 sends a packet to host 103a, node 102 sends the packet through one or more tunnels of the second tunnel group to node 101. Then node 101 sends the packet to node 103a through interconnected networks 117.

Similarly, as the number of tunnels in the second tunnel group can be more than one, node 102 may use a plurality of tunnels in the second tunnel group to transmit data packets. In one variant, the data packets belong to one session and node 101 reorders the packets before transmitting the packets to interconnected network 117 or host 103b. Those skilled in the art would appreciate that there are myriad ways to use multiple network interfaces to transmit data packets belonging to the same session.

According to one of the embodiments of the present invention, when a tunnel is used to transmit data packets from node 101 to node 102, the same tunnel is not used to transmit data packets from node 102 to node 101. For example, when tunnel 201b is used to transmit data packets from node 101 to node 102, tunnel 201b is not used to transmit data packets from node 102 to node 101. In order for node 102 to transmit data packets to 101, one or more of other tunnels, such as tunnel 201a, tunnel 201c or/and 201d, have to be used. A tunnel management message is sent by node 101 to instruct node 102 not to use tunnel 201b for transmitting data packets to node 101. In one variant, node 102 can overrule the instruction sent by node 101. The ability of overruling the instruction allows administrators of node 101 and 102 to have more flexibility to adapt to changing network environment. In one variant, node 102 can still transmit a portion of data packets to node 101 through tunnel 201b and the portion can be preconfigured by the administrator of node 102, administrator of node 102 and/or negotiated between node 101 and node 102.

In one variant, when a tunnel is used to transmit data packets from node 101 to node 102, the corresponding WAN interface establishing the tunnel at node 101 is not used to receive data packets from node 102. For example, when tunnel 201b is used to transmit data packets from node 101 to node 102, WAN interface 121b is not used to receive data packets from node 102. In one variant, when a tunnel is used to receive data packets from node 102 to node 101, the corresponding WAN interface establishing the tunnel at node 101 is not used to transmit data packets to node 102. For example, when tunnel 201a is used to receive data packets from node 102 to node 101, WAN interface 121a is not used to transmit data packets to node 101. There could be many reason why to have a WAN interface for transmitting or receiving data packets only, including the WAN interface is half-duplex, the network performance of the connection connected to the WAN interface is asymmetric, the cost of transmitting or receiving data packets through the connection connected to the WAN interface is asymmetric, and etc.

According to one of the embodiments of the present invention, node 101 transmits tunnel management messages to node 102 for managing one or more tunnels. The usage of tunnel management message includes: informing node 102 that which group a tunnel belongs to, informing node 102 how to use a tunnel, informing node 102 when to transmit data packets through a particular tunnel or tunnel group. In one variant, node 101 receives tunnel management messages from node 102 for managing one or more tunnels. Therefore, the usage of tunnel management message also includes: informing node 101 that which group a tunnel belongs to, informing node 101 how to use a tunnel, informing node 101 when to transmit data packets through a particular tunnel or tunnel group.

A tunnel management message comprises a tunnel identity field and an instruction field. For example, for illustration purposes only, a first tunnel and a third tunnel belong to the first tunnel group while a second tunnel belongs the second tunnel group. In such case, the tunnel identity field comprises the identities of the first tunnel, the second tunnel, and the third tunnel and the instruction field comprises information that the first tunnel and the third tunnel belong to the first tunnel group while a second tunnel belongs the second tunnel group. Therefore, after receiving the tunnel management message, node 102 can expect data packets to arrive through the first and the third tunnels and does not use the first and the third tunnels to transmit data packets to node 101 while only transmits data packets to node 101 through the second tunnel. Tunnel management messages may be sent when tunnels are about to be established, are being established or after tunnels have been established. In another example, a tunnel management message comprises information that assists node 102 to identify the tunnels and the corresponding tunnel groups in the instruction field and the identities of the corresponding tunnels in the tunnel identity field. There is no limitation that the tunnel message can only be sent by node 101, such that node 102 can also send the tunnel message. For example, a tunnel message may comprise information that tunnels 201a and 201b belong to a first tunnel group and tunnels 201c and 201d belongs to a second tunnel group. In one variant, the tunnel management messages also comprise an indicator to indicate whether a tunnel group is for both transmission and receiving, transmission only or receiving only. For example, an indicator indicates that a first tunnel group is for transmission only and a second tunnel group is for both transmission and receiving.

An indicator can be represented by a bit, a plurality of bits, a byte, a plurality of bytes, a string, a plurality of strings, XML messages, etc. Those who are skilled in the arts would appreciate that there are myriads ways to represent the indicator.

In one variant, one or more tunnels of the first tunnel group and one or more tunnels of the second tunnel group are aggregated to form one aggregated tunnel. When node 101 transmits data packets through the aggregated tunnel to node 102, node 101 uses the first tunnel group to transmit data packets. As tunnels 201a and 201b belong to the first tunnel group, node 101 transmits data packets through tunnels 201a and 201b to node 102. When node 102 transmits data packets through the aggregated tunnel to node 101, node 102 uses the second tunnel group to transmit data packets as instructed by the tunnel management messages. As tunnels 201c and 201d belong to the second tunnel group, node 102 transmits data packets through tunnels 201c and 201d to node 101. The tunnel management message can also be used to manage the aggregated tunnel. For example, when a tunnel is added to the first tunnel group, node 101 sends a tunnel management message to node 102 that there is one more tunnel in the aggregated tunnel.

According to one of the embodiments of the present invention, a tunnel management message comprises an indicator in the instruction field to indicate whether a tunnel is for both transmission and receiving, transmission only or receiving only. For example, for illustration purpose, tunnel 201a is used for node 101 to receive data packets from node 102 only; tunnels 201b, 201c and 201d are used for node 101 to transmit data packets to node 102 only. Therefore the indicator indicates that tunnel 201a is for receiving data packets only and tunnels 201b, 201c and 201d are used for transmitting data packets only. Node 102 then transmits data packets to node 101 through tunnel 201a and receives data from node 102 through tunnels 201a, 201b and 201c according to the information in the tunnel management message.

In one variant, a tunnel management message comprises status information of a tunnel. The status information can be part of information that is stored in the instruction field. In one variant, a tunnel management message also comprises a status field. The status field is used to hold information of status of the tunnel. For example, when node 101 updates node 102 about the status of a tunnel, node 101 sends a tunnel management message with the tunnel status in the status field to node 102. The tunnel identity field holds the identity of the corresponding tunnel. The instruction field in this case may be empty as the tunnel management message is for status reporting purpose.

In one variant, a tunnel can be used by node 101 to transmit and receive data packets to and from node 102. Therefore the indicator in the tunnel management messages shows that the tunnel can be used for both transmission and receiving. In one variant, for illustration purpose, a tunnel is preferably used by node 101 to transmit data packets to node 102 and is not preferably used by node 101 to receive data packets from node 102 even though the tunnel is capable for transmission and receiving. Therefore the indicator in the tunnel management messages shows the corresponding preference. Similarly, for illustration purpose, another tunnel is preferably used by node 102 to transmit data packets to node 101 and is not preferably used by node 102 to receive data packets from node 101 even though the tunnel is capable for transmission and receiving. Therefore the indicator in the tunnel management messages shows the corresponding preference of the another tunnel.

In one variant, the first tunnel group comprises one or more tunnels connecting to one or more networks and each network should have latency less than 150 milliseconds. When network latency is limited to less than 150 milliseconds, the network is considered as a fast network. More importantly, 150 milliseconds network latency is lower than the usual network latency of satellite communications. When network latency of the first tunnel group is more than 150 milliseconds, the advantage for node 101 to use the first tunnel group to transmit data packets to node 102 becomes not obvious as the network latency of the first tunnel group is not significantly better than the network latency of the second tunnel group if the second tunnel group is connected to one or more satellite connections. In such case, a tunnel management message is sent by either or both of node 101 and node 102 to other node that a tunnel group that was originally being used for receiving only, can then be used for both receiving and transmission, or a tunnel group that was originally being used for transmission only, can then be used for both receiving and transmission. The value of latency can be determined based on the average, maximum, minimum or other statistical calculations of latency observed for each tunnel in the tunnel group.

In one variant, when the first tunnel group has more than one tunnel, node 101 uses only one tunnel of the first tunnel group at a time to transmit data to node 102. The tunnel is selected from tunnels of the first tunnel group according to predefined criteria, such as network latency, packet drop rate, bandwidth, price, signal strength and etc. The predefine criteria is entered by the administrator of node 101 through a web interface, command line, system console, and/or any other data input mechanism. Alternatively, the predefine criteria is sent to node 101 through an Internet connection, an intranet connection or SMS from a remote server. The predefined criteria can be stored in a storage medium of node 101, such as secondary storage 304 or main memory 302. In one variant, the predefined criteria are first retrieved from a remote host and then stored in a storage medium of node 101 such as secondary storage 304 or main memory 302. In one variant, when the first tunnel group has more than one tunnel, node 101 uses link load-balancing technique to transmit data packet to node 102.

In one of the embodiments, node 101 uses the second tunnel group for transmitting data when a first condition(s) is met. For example, when node 101 is unable to use the first tunnel group for transmitting data to node 102 or the performance of the first tunnel group becomes unacceptable, the first condition(s) is met, and node 101 uses the second tunnel group for transmitting data. In one of the embodiments, node 101 uses the first tunnel group for receiving data when a second condition(s) is met. For example, when node 101 is unable to use the second tunnel group for receiving data from node 102 or the performance of the second tunnel group becomes unacceptable, the second condition(s) are met, and node 101 uses the first tunnel group for receiving data. The use of condition(s) allows flexibility that a tunnel group can be reconfigured when status or network performance of the tunnel group or another tunnel group changes.

The first and second conditions are based on at least one of the following criteria: coverage, performance, traffic congestion, and latency sensitivity. For example, when the first condition is based on coverage, the first condition is met when the location of node 101 is out of the coverage of one or more networks that the first tunnel group connects to. When the condition is met, node 101 cannot use the first tunnel group for transmitting data, and therefore node 101 uses the second tunnel group to transmit data. In another example, the second condition is based on coverage and is met when the location of node 101 is out of the coverage of one or more networks that the second tunnel group connects to. When the second condition is met, node 101 cannot use the second tunnel group for receiving data, and therefore node 101 uses the first tunnel group to receive data.

There are many reasons for node 101 being out of coverage of a network. For example, when one or more tunnels of the first tunnel group connects to a cellular network which does not provide coverage outside a specific country or region, node 101 becomes out of the coverage of the cellular network when node 101 moves out of the specific country or region. Using roaming services may not be cost effective in some scenarios, and hence node 101 starts using the second tunnel group for transmitting data. In another example, node 101 may lose coverage of one or more networks that the second tunnel group connects to, depending on its location, such as when it moves outdoors, or when it moves indoors. The second tunnel group comprises tunnel 201*a* which is established through satellite network 150. When satellite modem 161 moves indoors, and is not pointing toward the sky, node 101 may not be able to receive data through tunnel 201*a* belonging to the second tunnel group from the satellite, then node 101 uses the first tunnel group to receive data from node 102.

In another example, the first condition is based on performance and is met when the performance experienced by data transmitted or received through the first tunnel group becomes very poor and unsatisfactory. For example, node 101 starts using the second tunnel group for transmitting data when the first condition is met. In another example, the second condition is based on performance and is met when the performance experienced by data received through the second tunnel group becomes very poor. For example, node 101 starts using the first tunnel group for receiving data when the second condition is met.

In another example, when the first condition is based on latency sensitivity, the first condition is met when a data transfer is latency insensitive. When a data transfer is latency insensitive, it can use tunnels with high latency. Therefore, when the first condition is met and the data transfer is latency insensitive, node 101 can use the second tunnel group for transmitting data since the high latency of the second tunnel group is acceptable for the latency insensitive data transfer. The second tunnel group may have high latency while transmitting data when tunnel 201*a* is in the second tunnel group because, for example, tunnel 201*a* is established through satellite network 150. Alternatively, when the second condition is based on latency sensitivity, and a data transfer from node 102 to node 101 is latency sensitive, node 101 uses the first tunnel group for receiving data from node 102. When a data transfer is latency sensitive, it is preferable to use tunnels with low latency. For example, the data being transferred is generated by a real-time audio conversion application and any delay in transmitting or receiving the data will make the audio conversion difficult to be listened to. The second tunnel group comprising tunnel 201*a* may have higher latency than the first tunnel group. Therefore the first tunnel group is used by node 101 to receive data belonging to a latency sensitive data transfer from node 102.

There can be one or more first conditions and one or more second conditions. The first condition(s) and second condition(s) may or may not be based on the same criteria. A condition can be based on one or more criteria.

According to one of the embodiments, when a tunnel group has more than one tunnel, the network latency of the first tunnel group is the average latency, the maximum latency, the minimum latency, or the latency variance of the latencies of the more than one tunnel. For example, when the network latency of the first tunnel group is used to determine whether the first tunnel group should be used for transmitting data, then the determination is based on the average latency, the maximum latency, the minimum latency, or the latency variance of the latencies of the more than one tunnels belonging to the first tunnel group.

In another example, when network latency of the second tunnel group is used to determine whether the second tunnel group should be used for receiving data, then the determination is based on the average latency, the maximum latency, the minimum latency, or the latency variance of the latencies of the more than one tunnels belonging to the second tunnel group. The administrator of node 101 and/or node 102 can determine which kind of latency suits their needs.

In one of the embodiments of the present invention, processing unit 301 determines whether the first tunnel group should be used for transmitting data, based on performance criterion/criteria. The performance criterion/criteria is/are selected from a group comprising packet delay, bandwidth, throughput, packet loss, packet drop, power consumption, and signal noise ratio, round-trip time, interference level, error rate, quality of service, queuing delay, and packet jitter. In one variant, a threshold is predefined for the selected performance criteria, and when the threshold is not satisfied, processing unit 301 determines to use the second tunnel group for transmitting data. Processing unit 301 keeps monitoring the performance of the tunnels of the first tunnel group in order to determine whether the threshold is satisfied or not.

In one of the embodiments, processing unit 301 determines whether the second tunnel group should be used for receiving data, based on performance criterion/criteria. The performance criterion/criteria is/are selected from a group comprising network latency, response time, packet delay, bandwidth, throughput, packet loss, packet drop, power consumption, and signal noise ratio, round-trip time, interference level, error rate, quality of service, queuing delay, and packet jitter. In one variant, a threshold is predefined for the selected performance criteria, and when the threshold is not satisfied, processing unit 301 determines to use the first tunnel group for receiving data. Processing unit 301 keeps monitoring the performance of the tunnels of the second tunnel group in order to determine whether the threshold is satisfied or not.

In one of the embodiments of the present invention, processing unit 301 selects tunnels for the first tunnel group and the second tunnel group based on one or more performance criteria. The performance criteria are selected from a group comprising network latency, response time, packet delay, bandwidth, throughput, packet loss, packet drop, power consumption, signal noise ratio, round-trip time, interference level, error rate, quality of service, queuing delay, usage price, location and packet jitter. In one variant, thresholds are predefined for the selected performance criteria corresponding to the first tunnel group and the selected performance criteria corresponding to the second tunnel group. For example, processing unit 301 determines whether tunnel 201b satisfies the threshold for the selected performance criteria corresponding to the first tunnel group. If tunnel 201b satisfies the threshold for the selected performance criteria corresponding to the first tunnel group, tunnel 201b belongs to the first tunnel group. Similarly, processing unit 301 determines whether tunnel 201a satisfies the threshold for the selected performance criteria corresponding to the second tunnel group. If tunnel 201a satisfies the threshold for the selected performance criteria corresponding to the second tunnel group, tunnel 201a belongs to the second tunnel group. The performance criteria for selecting tunnels for the first tunnel group and the performance criteria for selecting tunnels for the second tunnel group may or may not be the same.

It is possible that a tunnel does not belong to any tunnel group if its performance does not meet the performance criterion/criteria of the tunnel group.

In one of the embodiments of the present invention, processing unit 301 keeps monitoring performance of each of the tunnels belonging to the first tunnel group and the second tunnel group. For example, tunnel 201b and tunnel 201c belong to the first tunnel group. The selected performance criteria corresponding to the first tunnel group are network latency and throughput. The threshold defined for network latency is 150 milliseconds, such that the network latency of a network that a tunnel connects to must be less than 150 milliseconds. The threshold for throughput is 20 Mbps, such that the throughput of data transmission through a tunnel should in general be equal to or more than 20 Mbps. Processing unit 301 periodically determines whether tunnel 201b satisfies the thresholds for network latency and throughput. If the network latency of a network that tunnel 201b connects to becomes significantly more than 150 milliseconds, processing unit 301 removes tunnel 201b from the first tunnel group because tunnel 201b does not satisfy the threshold. Similarly, if the throughput of data transmission through tunnel 201b becomes in general less than 20 Mbps, processing unit 301 removes tunnel 201b from the first tunnel group because tunnel 201b does not satisfy the threshold. In one variant, tunnel 201b should satisfy thresholds of both the performance criteria for remaining in the first tunnel group. Alternatively, tunnel 201b should satisfy threshold of at least one of the performance criteria for remaining in the first tunnel group. In one variant, processing unit 301 determines to removes tunnel 201b from the first tunnel group only after tunnel 201b has not been satisfying the thresholds of the performance criteria for a predefined time period. For example, processing unit 301 determines periodically whether tunnel 201b should remain in the first tunnel group. If tunnel 201b does not satisfy the threshold of the performance criteria during three consecutive determinations of processing unit 301, then processing unit 301 removes tunnel 201b from the first tunnel group. In another example, if processing unit 301 determines that network latency of a network that tunnel 201b connects to has been more than 150 milliseconds for more than fifteen minutes, processing unit 301 removes tunnel 201b from the first tunnel group. When tunnel 201b is removed from the first tunnel group, processing unit 301 uses tunnel 201c of the first tunnel group to transmit data.

Throughput of a tunnel can be determined by processing unit 301 by transmitting data packets or testing packets through the tunnel. The throughput estimated can be average throughput, minimum throughput maximum throughput. The format of the testing packets is preferably the same as the format of data packets that are transmitted using tunnel 201b.

In another example, tunnel 201a and 201d belong to the second tunnel group. The selected performance criteria corresponding to the second tunnel group are usage price and packet drop rate. As some carriers may charge higher usage price after a tunnel connects to a network for a certain time period, the usage price may increase while a tunnel is established. Processing unit 301 periodically determines whether the usage price of tunnel 201a and 201d is under a threshold. If the usage price of a tunnel, such as tunnel 201a, becomes above the threshold, processing unit 301 removes tunnel 201a from the second tunnel group. When tunnel 201a is removed from the second tunnel group, node 101 uses tunnel 201d for receiving data. Processing unit 301 also monitors packet drop rate through tunnels 201a and 201d. When the packet drop rate of a tunnel, such as tunnel 201d, becomes higher than a threshold, processing unit 301 removes tunnel 201d from the second tunnel group. In one variant, tunnel 201a should satisfy thresholds of both the performance criteria for being kept in the second tunnel group. Alternatively, tunnel 201a should satisfy threshold of at least one of the performance criteria for being kept in the second tunnel group.

According to one of the embodiments of the present invention, a tunnel belongs to a tunnel group but is not being utilized. For illustration purpose only, tunnels 201b, 201b and 201c belong to the first tunnel group and tunnel 201a belongs to the second tunnel group. The first tunnel group is used to transmit data from node 101 to node 102 and the second tunnel group is used to transmit data from node 102 to node 101. It is possible that not all tunnels 201b, 201b and 201c are used at the same time to transmit data from node 101 to node 102. In one variant, only one of the tunnels 201b, 201b and 201c is used to transmit data while the other two tunnels are used for backup or hot-failover purpose. In one variant, two of the tunnels 201b, 201b and 201c are used to transmit data while the remaining one is not used. The decision of selecting tunnel(s) for utilization and how to use the tunnels can be predefined by administrator of node 101, administrator of node 102 or the system operator operating both nodes 101 and 102. The decision of how data is being distributed among the utilized tunnels can be defined before the tunnels are set, during the establishment of the tunnels and/or anytime after the tunnels are established. Although this illustration only concerns the first tunnel group and tunnels of the first tunnel group, it also applies to the second tunnel group and the tunnels of the second tunnel group.

In one of the embodiments of the present invention, a priority is assigned to each tunnel of a tunnel group by node 101. For example, tunnels 201b, 201c and 201d belong to the first tunnel group. Node 101 assigns highest priority to tunnel 201b, second-highest priority to tunnel 201c and lowest priority to tunnel 201d. Node 101 uses any two tunnels belonging to the first tunnel group at a given time for transmitting data. Therefore, since tunnels 201b and 201c have a higher priority than tunnel 201d, node 101 uses tunnels 201b and 201c for transmitting data when possible. If a connection through tunnel 201b fails, node 101 then starts using tunnel 201c and 201d for transmitting data. The connection through tunnel 201b may fail for various reasons, such as traffic congestion, tunnel 201b not having enough capacity, no network coverage, or equipment malfunctioning. Alternatively, if performance of data transmission through tunnel 201b deteriorates significantly, node 101 stops using tunnel 201b and starts using tunnels 201c and 201d for transmitting data.

In another example, tunnels 201a and 201b belong to the second tunnel group. Node 101 assigns highest priority to tunnel 201a and lowest priority to tunnel 201b. For example, node 101 is configured with a predefined configuration to assign highest priority to tunnel 201a in the second tunnel group because tunnel 201a is established through satellite network 150. In another example, node 101 assigns the highest priority to tunnel 201a in the second tunnel group because tunnel 201a has the highest throughput and largest coverage area. If a connection through tunnel 201a fails, node 101 starts using tunnel 201b for receiving data. The connection through tunnel 201a may fail for various reasons. For example, when satellite modem 161 is moved indoors, then it may not point directly at satellite network 150, and thus the connection through tunnel 201a may fail. In another example, the network latency for receiving data through tunnel 201a may become very high and the connection may fail because of high network latency.

Priority is assigned to tunnels in a tunnel group according to one or more performance criteria or can be assigned according to a predefined configuration. A predefined configuration may be entered by an administrator or a user of node 101 through a web interface, an application programming interface (API), a command line interface or a console.

When the priority is assigned according to performance criteria, node 101 determines performance of each tunnel in a tunnel group. For example, processing unit 301 may assign highest priority to tunnel 201b in the first tunnel group because tunnel 201b has the highest throughput and the lowest packet drop rate. Alternatively, processing unit 301 may assign highest priority to tunnel 201b in the first tunnel group because tunnel 201b has the lowest usage price.

In one of the embodiments of the present invention, when performance of a tunnel in a tunnel group deteriorates, the tunnel is not removed from the tunnel group, but node 101 determines not to use the tunnel. For example, when performance of a tunnel, such as tunnel 201b, belonging to the first tunnel group, deteriorates and becomes unsatisfactory, node 101 stops using tunnel 201b for transmitting data until the performance of tunnel 201b becomes satisfactory again. Tunnel 201b is marked as inactive and node 101 uses other tunnel(s) in the first tunnel group, such as tunnel 201c, to transmit data. Node 101 may determine that performance of tunnel 201b has deteriorated based on one or more performance criteria. For example, when packet drop rate of data transmission through tunnel 201b has increased significantly, node 101 stops using tunnel 201b for transmitting data.

In another example, when performance of a tunnel, such as tunnel 201a, belonging to the second tunnel group, deteriorates and becomes unsatisfactory, node 101 stops using tunnel 201a for receiving data until the performance of tunnel 201a becomes satisfactory again. Tunnel 201a is marked as inactive and node 101 uses other tunnel(s) in the second tunnel group, such as tunnel 201d, to receive data. Node 101 may determine that performance of tunnel 201a has deteriorated based on one or more performance criteria. For example, when latency of tunnel 201a increases significantly, node 101 stops using tunnel 201a for receiving data.

The benefits of not removing a tunnel whose performance has deteriorated from a tunnel group includes that node 101 may be to be able to start using the tunnel again as soon as the performance of the tunnel becomes satisfactory. Processing unit 301 does not need to determine again as to whether the tunnel should belong to the tunnel group or not.

In one of the embodiments, a tunnel may belong to both the first tunnel group and the second tunnel group. For example, tunnel 201b belongs to both the first tunnel group and the second tunnel group. Tunnel 201b is then used by node 101 for transmitting and receiving data to and from node 102 respectively. The first tunnel group comprises tunnels 201b and 201c, and the second tunnel group comprises tunnels 201a and 201b. Node 101 uses tunnels 201b and 201c for transmitting data, and tunnels 201a and 201b for receiving data. In other words, node 101 uses tunnel 201c only for transmitting data, tunnel 201a only for receiving data, and tunnel 201b for both transmitting and receiving data. Processing unit 301 may select tunnel 201b for belonging to both the first tunnel group and the second tunnel group because tunnel 201b has very good performance, such as high throughput, low packet drop rate, low latency, low usage price, or good performance based on other performance criteria.

When processing unit 301 of node 101 or processing unit 401 of node 102 determines that a tunnel leaves or joins a tunnel group, new tunnel management messages are sent by the processing unit to inform the other processing unit that the tunnel should be used or not and how to use the tunnel.

In one variant, when tunnel management messages indicate that the first tunnel group is only used by node 101 to transmit data to node 102, the first tunnel group is not allowed to be used for receiving data from node 101 to node 102 even if a corresponding condition has been met. Similarly when the tunnel management message indicates that the second tunnel group is only used by node 101 to receive data from node 102, the second tunnel group is not allowed to be used for transmitting data to node 102 even if a corresponding condition has been met. Alternatively, new tunnel management messages are sent by node 101 or node 102 to update that the first tunnel group and/or the second tunnel group can be used for bidirectional communications. Alternatively, new tunnel management messages are sent by node 101 or node 102 to update that the first tunnel group and/or the second tunnel group are no longer used for bidirectional communications and can only used for transmitting data from node 101 and/or receiving data by node 101 respectively.

The use of new tunnel management messages allow the flexibility to change how the first tunnel group and the second tunnel group is used for transmitting and receiving data after the tunnel have been established. In one variant, the new tunnel management messages are used to manage one or more specific tunnel, instead of a tunnel group. This allows more granular management of tunnel.

In one variant, there is no need to transmit tunnel management message when the first tunnel group has already been used to transmit data from node 102 to node 101. This is because of the fact that when data has arrived from the first tunnel group to node 101, node 101 is able to determine that node 102 has determined to use the first tunnel group to transmit data without the assistance of tunnel management message. Similarly, there is no need to transmit tunnel management message when the second tunnel group has already been used to transmit data from node 101 to node 102.

In one variant, in the case that node 101 is no longer able to or determines not to receive data through the second tunnel group or one of the tunnels of the second tunnel group, such as in the situation of being out of coverage, node 101 will inform node 102, by using tunnel management message, not to further transmit data through the second tunnel group or the one of the tunnels of the second tunnel group. Similarly, in the case that node 102 is no longer able to or determines not to receive data through the first tunnel group or one of the tunnels of the first tunnel group, such as in the situation of heavy packet loss, node 102 will inform node 101, by using tunnel management message, not to further transmit data through the first tunnel group or the one of the tunnels of the first tunnel group.

Figure 6A:
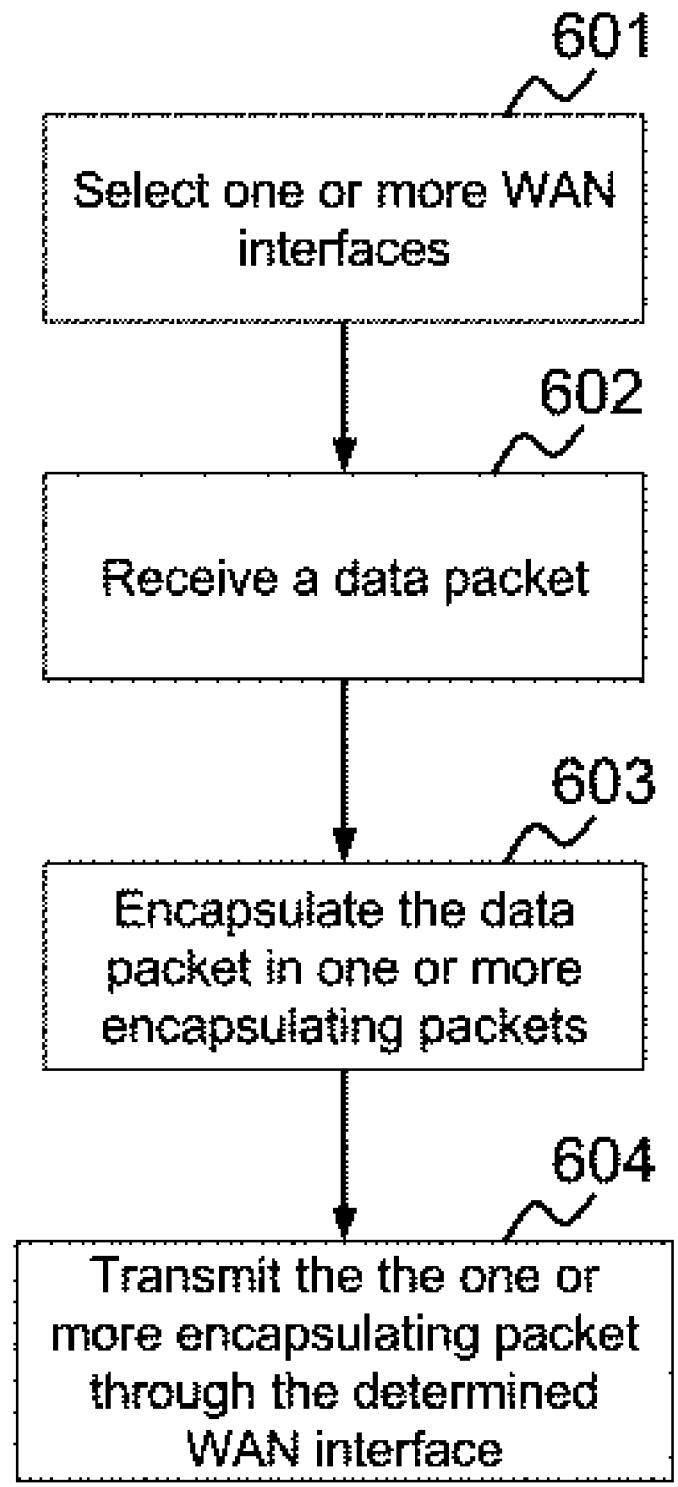
FIG. 6A is a flowchart illustrating a process for a first node to transmit and receive data to and from a second node according to one of the embodiments of the present invention.
Figure 6B:
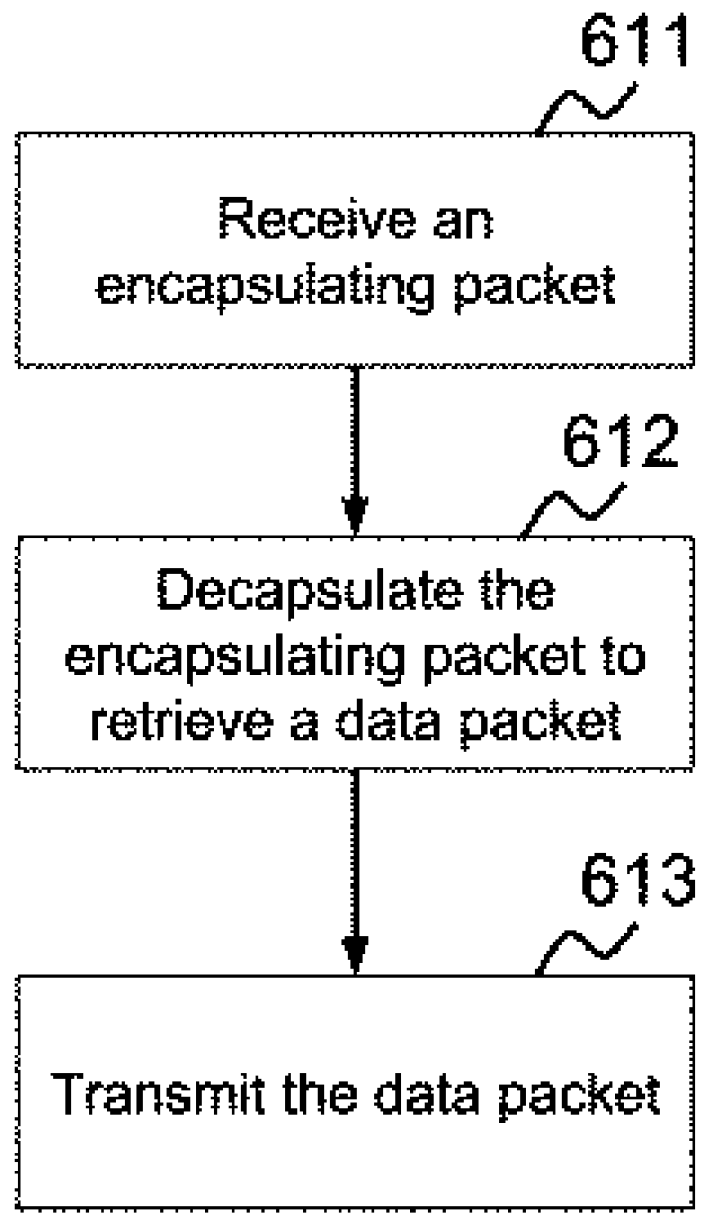
FIG. 6B is a flowchart illustrating a process for a first node to transmit and receive data to and from a second node according to one of the embodiments of the present invention.

FIG. 6A and FIG. 6B are two flowcharts illustrating one of the embodiments of the present invention that node 101 transmits and receives data packets to and from node 102 respectively.

Referring to FIG. 1, node 101 first selects a first one or more WAN interfaces of node 101, such as WAN interface 121a, 121b, 121c and 121d, at step 601. When node 101 receives a data packet from a host or node that connects to one of its LAN interfaces 122a and 122b at step 602, it encapsulates the data packet into one or more encapsulating packets at step 603. Those who are skilled in the art would appreciate that the step of encapsulating a data packet allows the data packet be sent through a tunnel. In one variant, step 601 and step 602 can be swapped such that the selection of WAN interface is performed after a data packet has been received. The first one or more WAN interfaces of node 101 selected are mainly used for transmitting data packets from node 101 to node 102. In one variant, node 102 does not transmit data packets to node 101 through the first one or more WAN interfaces of node 101. In one variant, node 102 transmits a small number of packets to node 101 through the first one or more WAN interfaces of node 101, and the packets are used for managing purpose, such as status information of the connections connected to the first one or more WAN interfaces.

Then, at step 604, node 101 transmits the one or more encapsulating packets through the first one or more WAN interfaces selected at step 601. The first one or more WAN interfaces may connect to a wired or wireless network.

Node 101 also selects a second one or more WAN interfaces mainly for receiving data packets from node 102. The data packets from node 102 may be encapsulating packets. In one variant, node 102 only transmits data packets to node 101 through the second one or more WAN interfaces of node 101, such that node 101 only receives data packets from node 102 through the second one or more WAN interfaces of node 101. In one variant, node 102 transmits a small number of packets to node 101 through WAN interface(s) of node 101 that do (does) not belong to the second one or more WAN interfaces of node 101; the packets are used for managing purpose, such as transmitting health check packets, status information of the connections connected to the one or more WAN interfaces. Such that, node 101 only receives the small number of packets from node 102 through the WAN interfaces of node 101 not belonging to the second one or more WAN interfaces of node 101.

In one variant, node 101 sends node 102 information of the second one or more WAN interfaces by using a WAN interface management message. In such case, the information includes the identities of WAN interface(s) of node 101 that is (are) preferred for node 102 for transmitting data packets to node 101. Therefore node 102 can set the destination address of the encapsulating packet to be the address of the preferred WAN interface(s) of node 101. In one variant, the information is used as an instruction for node 102. In one variant, node 102 also determines by itself which WAN interface(s) of node 101 should be used to receive data packets from node 102 to node 101.

The usage of WAN interface management message includes: informing node 102 how to use a WAN interface of node 101, informing node 102 when to transmit data packets through a particular WAN interface of node 101. In one variant, node 101 receives WAN interface management messages from node 102 for managing one or more WAN interfaces. Therefore, the usage of WAN interface management message also includes: informing node 101 how to use a WAN interface, informing node 101 when to transmit data packets through a particular WAN interface.

As shown in FIG. 6B, when node 101 receives an encapsulating packet from node 102 through one of WAN interfaces 121*a*, 121*b*, 121*c* and 121*d* at step 611, node 101 decapsulates the encapsulating packet to retrieve a data packet at step 612. Then node 101 transmits the data packet to a host or node through one of its LAN interfaces 122*a* and 122*b* according to the destination address of the data packet at step 613.

It is preferred that node 101 selects the first one or more WAN interface that connects to a network with network latency less than 150 milliseconds at step 601. This allows the encapsulating packets to reach node 102 quickly. Therefore, it is preferred not to choose a WAN interface that connects to a satellite network because the satellite round trip time is usually more than 150 milliseconds.

In one variant, the encapsulation and decapsulation performed by node 101 at step 603 and step 612 respectively particularly allows data to be transmitted to and received from node 102 through one or more tunnels. The one or more tunnels can be established via a pair of WAN interfaces, such as WAN interface 121*b* and WAN interface 131*b*.

In one preferred embodiment, node 102 transmits encapsulating packets to node 101 through a satellite network, for example through tunnel 201*a*. Although the satellite round trip time may be larger than the round trip time of other networks, the bandwidth offered by a satellite network could be larger than that of other networks. Further, it may be more economical for the administrator of node 102 to transmit data packets, and/or encapsulating packets to node 101 through a satellite network.

In one variant, processing unit 401 of node 102 determines which WAN interface of node 101 is used to transmit the encapsulating packets from node 101 to node 102. For example, node 102 may select WAN interface 121*b* of node 101. When node 102 has made the WAN interface selection decision, it sends a WAN interface management message to node 101 about the decision. Without the WAN interface management message, node 101 will not be able to recognize the need to use WAN interface 121*b* to transmit encapsulating packets to node 102.

According to one of the embodiments of the present invention, the WAN interface selection decision at step 601 and the WAN interface selection decision for node 102 to determine which WAN interface for transmitting and receiving encapsulating packets can be determined according to: network performance of network connecting to WAN interfaces, conditions, network coverage, geographical location, network usage price, etc.

Figure 6C:
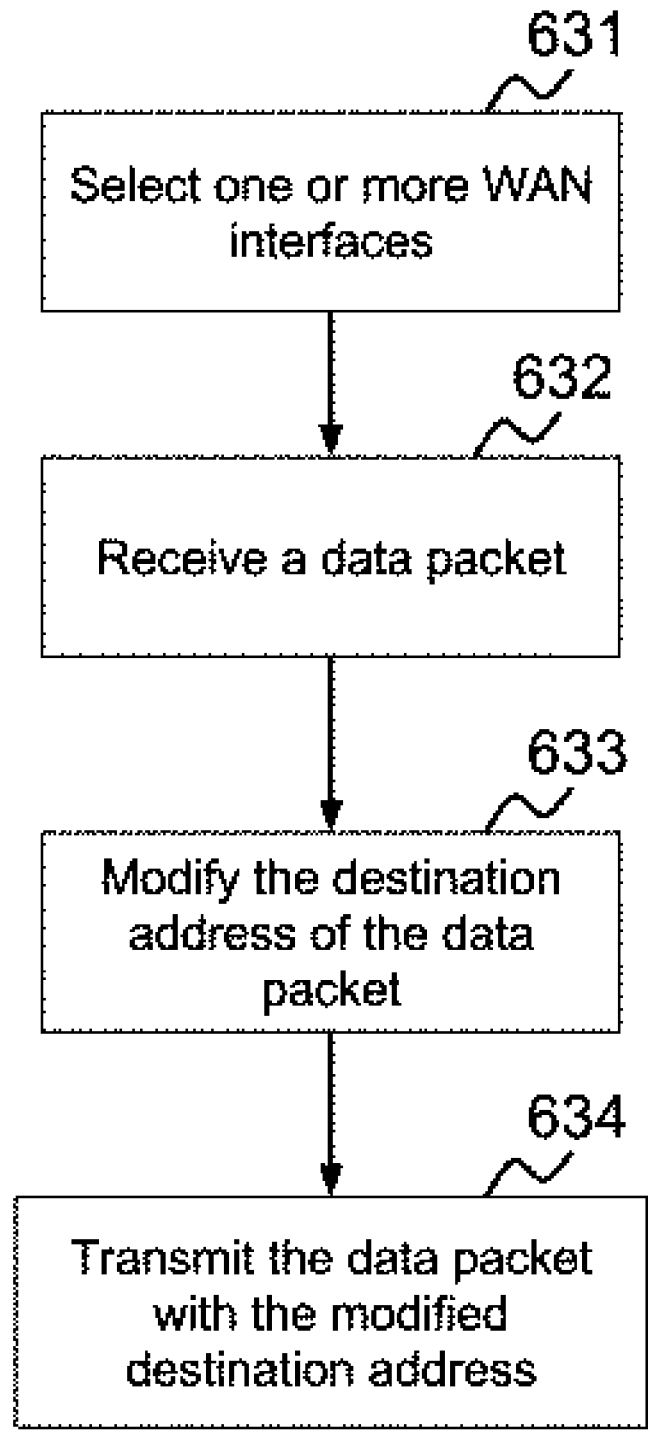
FIG. 6C is a flowchart illustrating a process for a first node to transmit and receive data to and from a second node according to one of the embodiments of the present invention.

FIG. 6C is a flowchart illustrating various embodiments according to the present invention. Node 101 transmits data packets to and receives data packets from node 102 respectively. Node 101 and node 102 together perform as a proxy/gateway for the host or node that connects to one of the LAN interfaces 122*a* and 122*b* of node 101. Those who are skilled in the arts would appreciate the techniques of updating source address, updating destination address, and restoring the original destination address are described below, in general, deployed by proxies or gateways.

Similar to the flowchart illustrated in FIG. 6A, node 101 first selects one or more WAN interfaces, such as WAN interface 121*a*, 121*b*, 121*c* and 121*d*, at step 631. When node 101 receives a data packet from a host or node that connects to one of its LAN interfaces 122*a* and 122*b* at step 632, node 101 modifies the destination address of the data packet received to be the address of one of WAN interfaces of node 102 at step 633. The original destination address of the data packet is recorded and is sent to node 102 before the data packet is transmitted. The original destination address is used for node 102 to restore the destination address.

Then node 101 transmits the data packet with the modified destination address through the one or more WAN interfaces selected at step 634. When node 102 receives the packet, node 102 restores the destination address to the original destination address and modifies the source address of the data packet to be the address of one of the WAN interfaces of node 102, and then transmits the data packet to the original destination address. The purpose of restoring the original destination address is to allow the data packet be transmitted to the original destination address. The purpose of updating the source address of the data packet to be the address of one of the WAN interfaces of node 102 is to allow the host or node of the original destination address be able to respond to the transmitted data packet using the address of one of the WAN interfaces of node 102, instead of using one of the WAN interfaces of node 101. When node 102 receives the response, it forwards the response to one of the WAN interfaces of node 101 by modifying the destination address of the IP packets holding the response to the address of the WAN interface of node 101. When node 101 receives the IP packets holding the response, node 101 modifies the source address of the IP packets to the address of the original destination address.

In one variant, the WAN interface of node 101 selected by node 101 for transmitting the data packets to node 102 and the WAN interface of node 101 selected by node 102 for receiving data packets from node 102 can be the same or different. For example, at step 601 node 101 selects WAN interface 121*b* to transmit encapsulating packets and node 102 selects WAN interface 121*a* to receive encapsulated response to the data packets encapsulated in the encapsulating packets. Similarly, for example, at step 631, node 101 selects WAN interface 121*c* to transmit data packets and node 102 selects WAN interface 131*c* to transmit response to the data packets to node 101.

Figure 7:
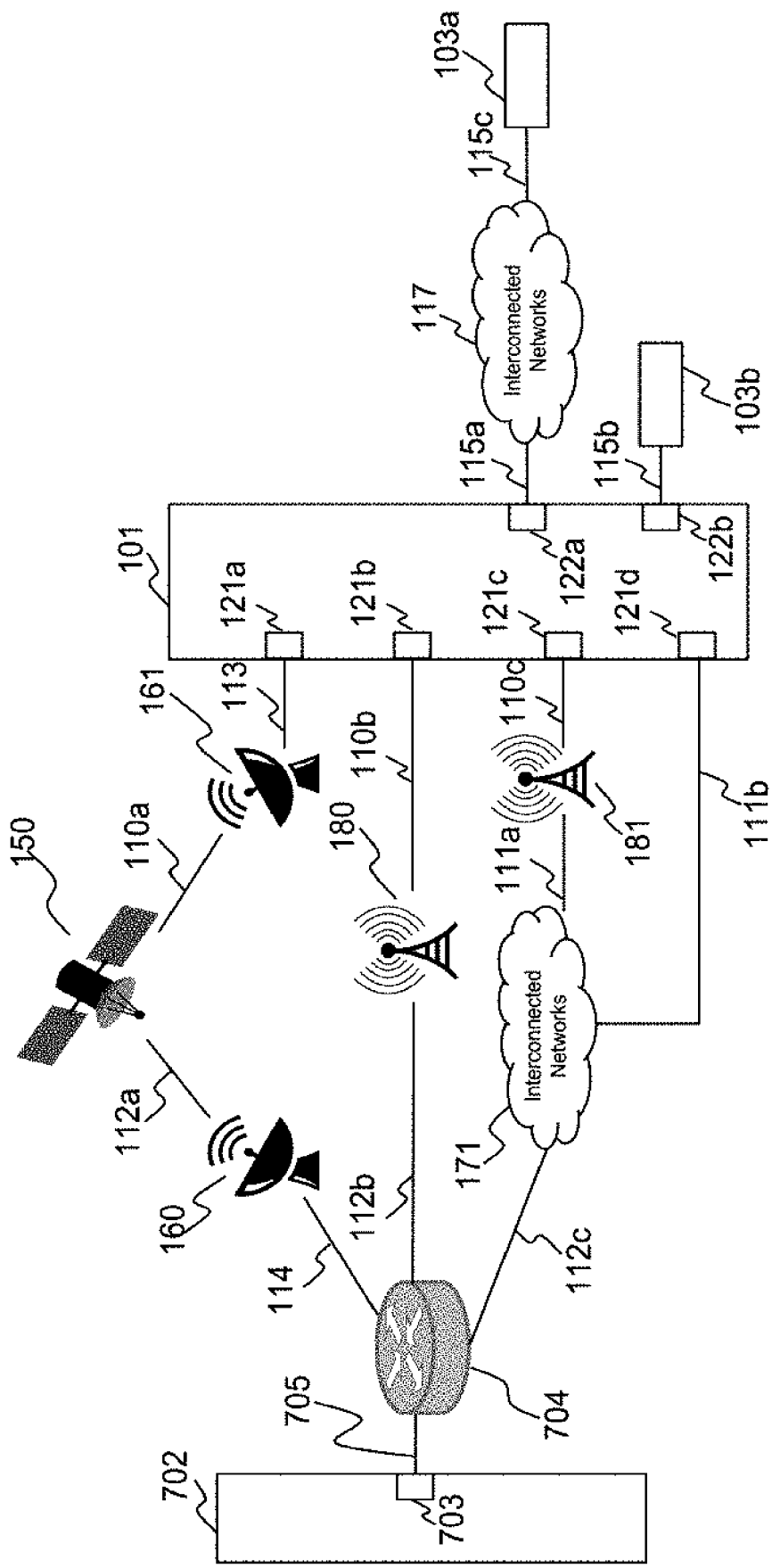
FIG. 7 illustrates a network configuration according to various embodiments of the present invention.

FIG. 7 illustrates a network configuration according to various embodiments of the present invention.

Node 702 can perform as a gateway, VPN gateway, or proxy for node 101 such that, for example, node 101, host 103*b*, hosts and nodes in interconnected networks 117 and host 103*a* can transmit and receive data packets through node 702.

According to one of the embodiments of the present invention, node 101 is configured to use a first one or more WAN interface to send packets to node 702 and a second one or more WAN interface to receive packets from node 702. For example, node 101 uses WAN interfaces 121*b* and 121*c* to send data packets to node 702 and uses WAN interface 121*a* receive data packets from node 702. Node 101 can be configured by an administrator or a network operator, such as the operator of satellite network 150 and the operator of wireless network 180. In one example, as node 101 is already configured which WAN interface(s) is (are) used, there is no need to perform step 601 as there is no WAN interface selection being performed.

Figure 8:
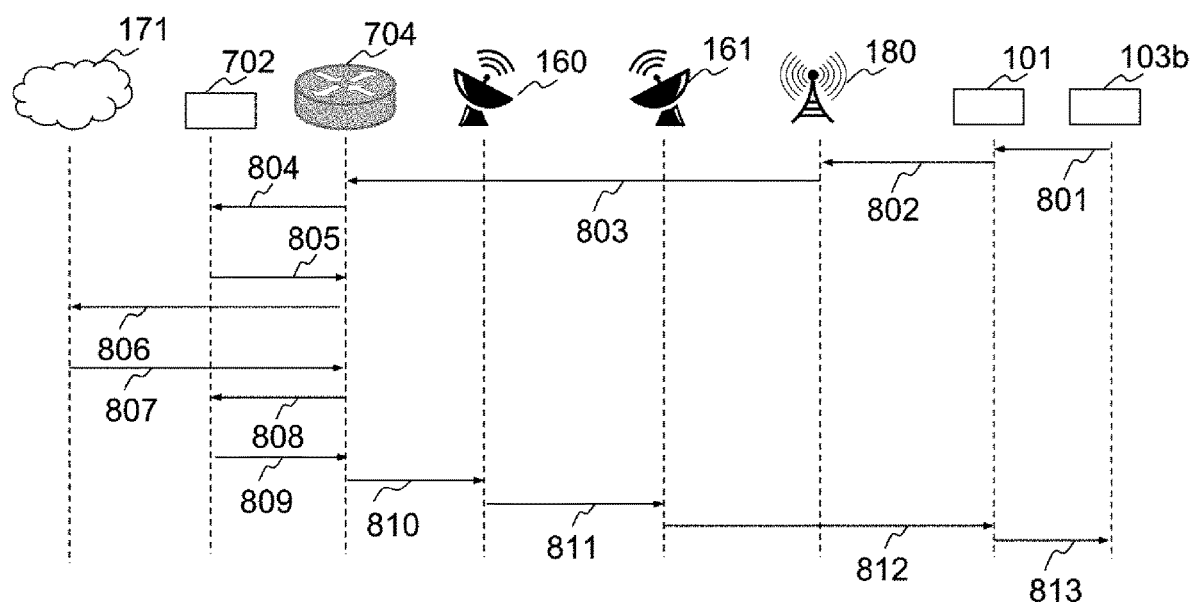
FIG. 8 illustrates the communication steps of a node communicating with a host according to one of the embodiments of the present invention.

FIG. 8 illustrates the communication steps of an example that node 702 performs as a gateway for host 103*b* to communicate with a host in interconnected networks 171.

Figure 9:
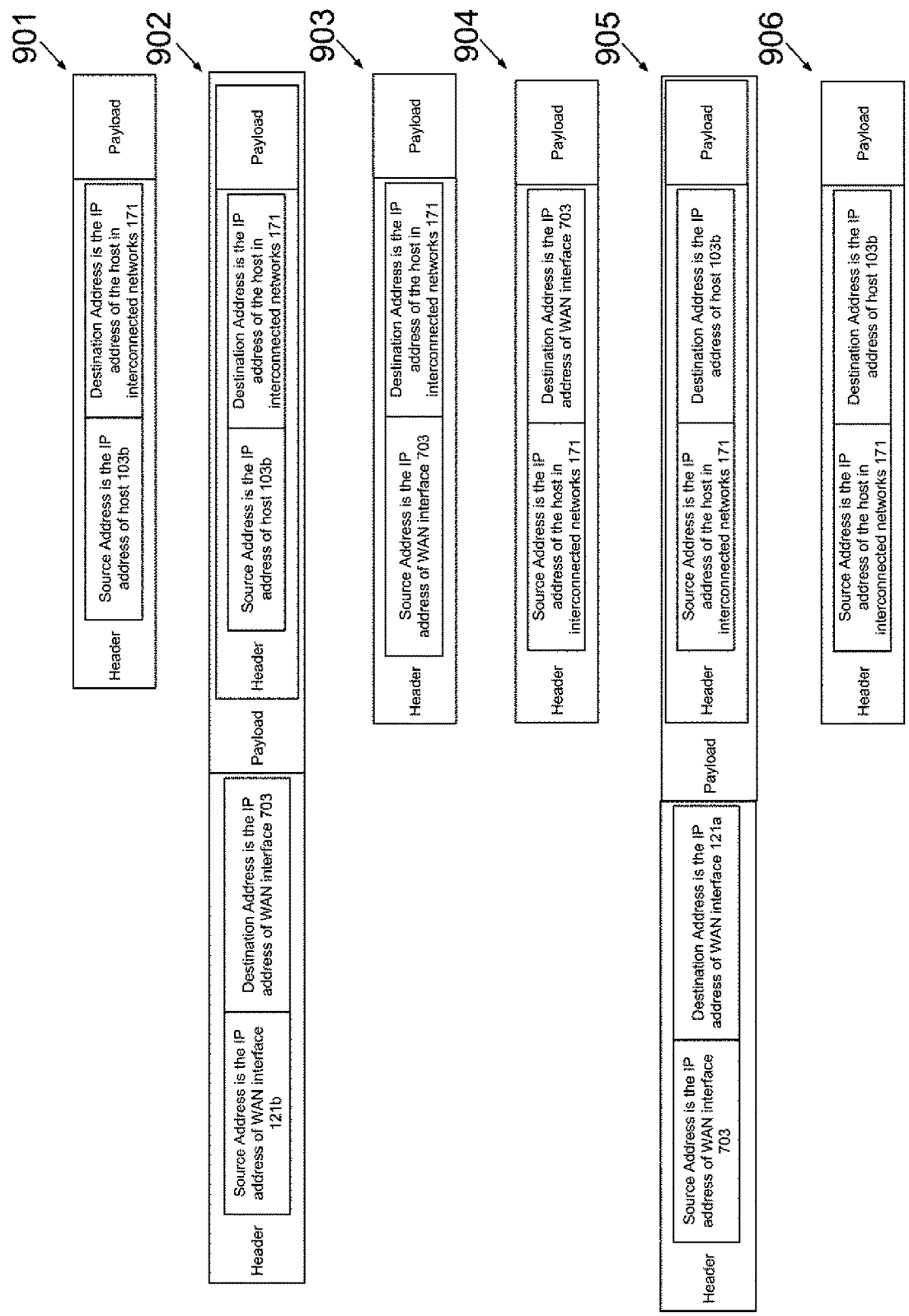
FIG. 9 illustrates the structure of IP packet being transmitted at each communication step according to one of the embodiments of the present invention.

FIG. 9 illustrates the structure of IP packet being transmitted at each communication step of FIG. 8. When host 103*b* transmits IP packet 901 to a host in interconnected network 171, host 103*b* first transmits IP packet 901 to node 101 at step 801. IP packet 901 could be for service request, data transfer or any other purposes. The structure of IP packet 901 is illustrated in FIG. 9. In IP packet 901, the payload field is used to hold data. The header section has a destination address field and a source address field. The destination address field is the IP address of the host in interconnected networks 171. The source address field is the IP address of host 103*b*.

After node 101 has received IP packet 901 at communication step 801, node 101 encapsulates IP packet 901 in IP packet 902. As node 101 has a plurality of WAN interfaces, node 101 can choose any of the WAN interfaces to transmit IP packet 902. Alternatively, node 101 can select a WAN interface that has been determined or configured before the IP packet 901 has arrived. For example, node 101 selects a WAN interface based on: a configuration entered by an administrator of node 101; latency of the connection that a WAN interface connected to; a condition entered by an administrator of node 101; and instructions received from a remote server or node.

For illustration purpose, node 101 selects WAN interface 121*b*, then transmits IP packet 902 to wireless network 180 through a wireless modem connecting to WAN interface 121*b* at communication step 802. The payload field of IP packet 902 stores IP packet 901. The header section of IP packet 902 has a destination address field and a source address field. The destination address field of IP packet 902 is the IP address of WAN interface 703 of node 702. The source address field of IP packet 902 is IP address of WAN interface 121*b* of node 101.

As WAN interface 703 is reachable through router 704, wireless network 180 routes IP packet 902 to router 704 at communication step 803. Wireless network 180 may connect to router 704 through private interconnected networks or public interconnected networks. For example, if node 702 and wireless network 180 are operated by the same administrator, wireless network 180 can route IP packet 902 through a direct connection to router 704. On the other hand, if node 702 and wireless network 180 are not operated by the same administrator, in general, IP packet 902 will be routed to router 704 through public interconnected networks.

When router 704 receives IP packet 902, it routes IP packet 902 to WAN interface 703 at communication step 804. In one variant, router 704 performs as a gateway or a proxy with network address translation (NAT) capability and the destination address of IP packet 902 is then updated accordingly.

When node 702 receives IP packet 902, it decapsulates IP packet 902 to retrieve IP packet 901. After examining the destination address of IP packet 901, node 702 performs network address translation (NAT) on the source address of IP packet 901. The modified IP packet 901 is IP packet 903. Therefore IP packet 903 is based on IP packet 901. The source address of IP packet 903 is the IP address of WAN interface 703. Therefore if the host in interconnected network 171 replies, WAN interface 703 can receive the reply. The destination address of IP packet 903 is the same as the destination address of IP packet 901, which is the IP address of the host in interconnected networks 171 that host 103*b* tries to send IP packet 901 to. Node 702 then transmits IP packet 903 to router 704 at communication step 805.

When router 704 receives IP packet 903, it routes IP packet 903 to the host in interconnected networks 171 at communication step 806. In one variant, router 704 performs as a gateway or a proxy with NAT capability and the source address of IP packet 903 is then updated accordingly.

When the host in interconnected networks 171 receives IP packet 903, the host may or may not reply. If the host replies, it should reply with at least one IP packet, for example IP packet 904, at communication step 807. The destination address and source address of IP packet 904 is the IP address of WAN interface 703 and the IP address of the host in interconnected networks 171 respectively.

When router 704 receives IP packet 904, it routes IP packet 904 to node 702 at communication step 808. In one variant, router 704 performs as a gateway or a proxy with NAT capability and the destination address of IP packet 904 is then updated accordingly.

When node 702 receives IP packet 904, it performs NAT on IP packet 904. Such that IP packet 904 has been modified and the destination address of the modified IP packet 904 becomes the IP address of host 103*b*. Then node 702 encapsulates modified IP packet 904 in IP packet 905 and then transmits IP packet 905 to router 704 at communication step 809. The payload field of IP packet 905 stores modified IP packet 904. Therefore IP packet 905 is based on IP packet 904. The header section of IP packet 905 has a destination address field and a source address field. The destination address field of IP packet 905 is the IP address of one of WAN interfaces of node 101. For illustration purpose, node 702 selects WAN interface 121*a*. Therefore, the destination address field IP packet 905 is IP address of WAN interface 121*a*. The source address field of IP packet 905 is IP address of WAN interface 703.

As there can be more than one connections connecting to the plurality of WAN interfaces of node 101, node 702 can select one of the WAN interfaces of node 101 for transmitting IP packet 905 to node 101. Alternatively, node 702 can select a WAN interface that has been determined or configured before the IP packet 904 has arrived. For example, node 702 selects a WAN interface of node 101 based on: a configuration entered by an administrator of node 702; latency of the connection that a WAN interface connects to; a condition entered by an administrator of node 702; and instructions received from a remote server or node.

When router 704 receives IP packet 905, it routes IP packet 905 to satellite network 150 through satellite modem 160 at communication step 810. In one variant, router 704 performs as a gateway or a proxy with NAT capability and the destination address of IP packet 905 is then updated accordingly. In communication step 811, satellite modem 160 transmits IP packet 905 to satellite network 150, which then transmits IP packet 905 to satellite modem 161. Satellite modem 161 forwards IP packet 905 to node 101 in communication step 812 through connection medium 113.

When node 101 receives IP packet 905, it decapsulates IP packet 905 to retrieve modified IP packet 904, which is the same as IP packet 906 and then transmits IP packet 906 to host 103*b* according to the destination address in the header of IP packet 906 in communication step 813.

The communication steps shown in FIG. 8 illustrates that different WAN interfaces of node 101 are used for transmitting and receiving IP packets, even if the IP packets belong to the same session.

Those who are skilled in the arts would appreciate that when router 704 performs NAT, router 704 may need to use a state database to record the translation and the state database is in general stored in a storage unit of router 704.

In one variant, when node 702 receives IP packet 904 after step 808, it does not performs NAT on IP packet 904. Therefore IP packet 904 is not modified and IP packet 905 encapsulates IP packet 904, instead of modified IP packet 904. The destination of address of IP packet 904 is changed by node 101 to IP packet 906 after step 812. This allows NAT being performed by node 101, instead of by node 702. This may reduces the computing resources requirement of node 702.

According to one of the embodiments of the present invention, node 101 sends a WAN interface management message to inform node 702 which WAN interface of node 101 should node 702 transmit IP packets to. WAN interface management message comprises a WAN interface identity field and an instruction field. For example, for illustration purpose only, WAN interfaces 121a and 121d can be used by node 101 to receive IP packets from node 702 while WAN interfaces 121b and 121c cannot be used by node 101 to receive IP packets from node 702. The WAN interface management message comprises the identities of WAN interfaces 121a and 121d in the WAN interface identity field and the instruction field, which holds the information that WAN interfaces 121a and 121d can be used by node 101 to receive IP packets from node 702 while WAN interfaces 121b and 121c cannot be used by node 101 to receive IP packets from node 702. The WAN interface management messages may be sent anytime before IP packet 905 is transmitted by node 702 in step 809. In another example, identity(identities) of WAN interface(s) of node 101 that is(are) used for node 101 to transmit IP packets to node 702 is(are) stored in the WAN interface field and the instruction that this (these) WAN interface(s) is(are) used for transmission only is stored in the instruction field.

In one variant, a WAN interface management message comprises an indicator in the instruction field to indicate whether a WAN interface is for both transmission and receiving, transmission only or receiving only. For example, for illustration purpose, The indicator can represented by a bit, a plurality of bits, a byte, a plurality of bytes, a string, a plurality of strings, XML messages, etc. Those who are skilled in the arts would appreciate that there are myriads ways to represent the indicator.

In one variant, WAN interface management messages is determined and transmitted by one of node 101 or node 702. Therefore, the decision of which WAN interface of node 101 to use for transmitting and/or receiving IP packets is determined by node 101 or node 702. For example, an administrator of node 101 can determine which WAN interface(s) of node 101 and node 702 is (are) used for transmitting and/or receiving IP packets. Therefore, a WAN interface can be set as unidirectional transmission, unidirectional receiving or bidirectional.

In one variant, a WAN interface management message comprises status information of a WAN interface. The status information can be part of information stored in the instruction field. In one variant, the status is stored in a status field of WAN interface management message. For example, when node 101 updates node 102 about the status of a WAN interface, node 101 sends a WAN interface management message with the WAN interface status in the status field to node 102. The WAN interface identity field holds the identity of the corresponding WAN interface. The instruction field in this case may be empty as the WAN interface management message is for status reporting purpose.

According to one of the embodiments of the present invention, one or more tunnels are established between two WAN interfaces of two nodes and when a WAN interface is selected for transmission and receiving, transmission only or receiving only, the corresponding one or more tunnels that are established through the selected WAN interface will be affected by WAN interface management message. For example, when WAN interface 121a can only be used for receiving IP packets from node 702 and cannot be used for transmitting IP packets to node 702, the one or more tunnels that established through WAN interface 121a to WAN interface 705 can also only be used for receiving IP packets from node 702 and cannot be used for transmitting IP packets to node 702.

According to one of the embodiments of the present invention, an administrator of a node determines WAN interface pair stating a WAN interface of the node and a WAN interface of another node, such that the WAN interfaces stated in the WAN interface pair are used for transmitting and receiving, transmitting only or receiving only IP packet between the two nodes. For example, the administrator determines a WAN interface pair, WAN interface 121a and WAN interface 703, which is used for receiving IP packets from WAN interface 703 only. In another example, the administrator determines that a WAN interface pair, WAN interface 121d and WAN interface 703, is bidirectional, such that WAN interface 121 and WAN interface 703 can be used for transmitting and receiving IP packets to and from each other.

According to one of the embodiments, a node, such as node 102, intermediates access by a host, such as host 103a or 103b, to interconnected networks 172. In one example, node 102 terminates incoming access requests and connections at the application layer of the Open System Interconnection (OSI) reference model or of the TCP/IP model. In this example, node 102 operates as an application-layer proxy to protect resources in interconnected networks 172 from direct exposure to hosts connected to node 101. Node 102 receives incoming access requests encapsulated in a packet, decapsulates the access requests to reach the underlying application data, and sends the application data comprising the access requests to interconnected networks 172.

In another example, node 102 allows direct connections between layers of the OSI reference model or of the TCP/IP model. In this example, node 102 exchanges data using a secure channel negotiated with the requesting host, such as host 103a or 103b. Node 102 receives a secure request via the one of tunnels 201a, 201b, 201c or 201d, and makes requests to interconnected networks 172 on behalf of the requesting host, i.e. host 103a or 103b, to establish a data connection between the requesting host and interconnected networks 172.

FIG. 10 illustrates a webpage used to configure node 101. Webpage 1001 can be shown at a display of a laptop computer, desktop computer, handheld computing device, mobile phone or any device capable of displaying webpage 1001. Webpage 1001 has two parts: VPN Profile 1011 and WAN Connection Priority 1012. An administrator can enter the information required to setup a VPN using VPN Profile 1011 and configure priority, transmission and receiving of data of WAN interfaces in WAN Connection Priority 1012. The information is used to create one or more tunnels belonging to the VPN. For example, the information is used to create multiple tunnels and the multiple tunnels are aggregated to form one aggregated tunnel for the VPN. Those who are skilled in the art would appreciate that the information required includes security information, identity information and encryption information. In one variant, the information required is retrieved from a remote management server, a secured device coupled to node 101 or a preconfigured database. This releases the administrator the burden to enter required information manually through the web page.

WAN Connection Priority 1012 has three main sections: WAN interface identity 1021, priority selection 1022 and direction selections 1031 to 1033. As node 101 has four WAN interfaces, WAN interface identity 1021 has four WAN interfaces shown. For example, "WAN 1", "WAN 2", "WAN 3" and "WAN 4" in WAN interface identity 1021 corresponds to WAN interfaces 121*a*, 121*b*, 121*c* and 121*d* respectively. Priority selection 1022 is used to configure priority to WAN interfaces. For example, the priority of "WAN 1" is configured to be "OFF" that processing unit 301 will not use WAN interface 121*a* to transmit or receive data traffic. As the priority of "WAN 2", "WAN 3", "WAN 4" are configured to be "highest", processing unit 301 uses WAN interfaces 121*b*, 121*c* and 121*d* with the same priority. Direction selection 1031 is configured to be "Up Only", such that processing unit 301 only uses WAN interface 121*b* to transmit data. Direction selection 1032 is configured to be "Down Only", such that processing unit 301 only uses WAN interface 121*c* to receive data. Direction selection 1033 is configured to be "Up/Down Only", such that processing unit 301 uses WAN interface 121*d* to both transmit and receive data.

In one variant, the information used to configure WAN Connection Priority 1012 is retrieved from a remote management server, a secured device coupled to node 101 or a preconfigured database. This releases the administrator the burden to enter required information manually through the web page. The web page for configuring node 102 is similar and the number of WAN interfaces in WAN interface identity 1021 will be three as node 102 has three WAN interfaces.

FIG. 11 illustrates a webpage used to configure node 101. The design of webpage 1101 is similar to the design of webpage 1001. Webpage 1101 has two parts: VPN Profile 1111 and Tunnel Priority 1112. An administrator can enter the information required to setup a VPN using VPN Profile 1111 and configure priority, transmission and receiving of data of tunnels in Tunnel Priority 1112. VPN Profile 1111 can be identical to VPN Profile 1011 if the information required to setup VPN is the same.

Tunnel Priority 1112 has three main sections: tunnel identity 1121, priority selection 1122 and direction selections 1131 to 1133. As node 101 has established four tunnels with node 102, tunnel identity 1121 has four tunnels shown. For example, "Tunnel A", "Tunnel B", "Tunnel C" and "Tunnel D" in tunnel identity 1121 corresponds to tunnels 201*a*, 201*b*, 201*c* and 201*d* respectively. Priority selection 1122 is used to configure priority to tunnel. For example, the priority of "Tunnel A" is configured to be "OFF" that node 101 will not use tunnel 201*a* to transmit or receive data traffic. As the priority of "Tunnel B", "Tunnel C", "Tunnel D" are configured to be "highest", processing unit 301 uses tunnels 201*b*, 201*c* and 201*d* with the same priority. Direction selection 1131 is configured to be "Up Only", such that node 101 only uses tunnel 201*b* to transmit data. Direction selection 1132 is configured to be "Down Only", such that node 101 only uses tunnel 201*c* to receive data. Direction selection 1133 is configured to be "Up/Down Only", such that node 101 uses tunnel 201*d* to transmit and receive data.

In one variant, the information used to configure Tunnel Priority 1112 is retrieved from a remote management server, a secured device coupled to node 101 or a preconfigured database. This releases the administrator the burden to enter required information manually through the web page.

The web page for configuring node 102 is similar and the number tunnels in tunnel identity 1121 will be the same as the number of tunnels established between node 101 and 102 are also four.

In one variant, instead of shown tunnel identities in tunnel identity 1121, WAN interfaces of node 101 and node 102 are shown in tunnel identity 1121. As a tunnel can be established between one or more WAN interfaces of node 101 and one or more WAN interfaces of node 102, a tunnel identity can be replaced with the WAN interfaces used for establishing the tunnel.

The foregoing description of preferred embodiments of the present invention provides illustration and description, but is not intended to be exhaustive or to limit the invention to the precise form disclosed. Modifications and variations are possible in light of the above teachings or may be acquired from the practice of the invention.

Figure 12:
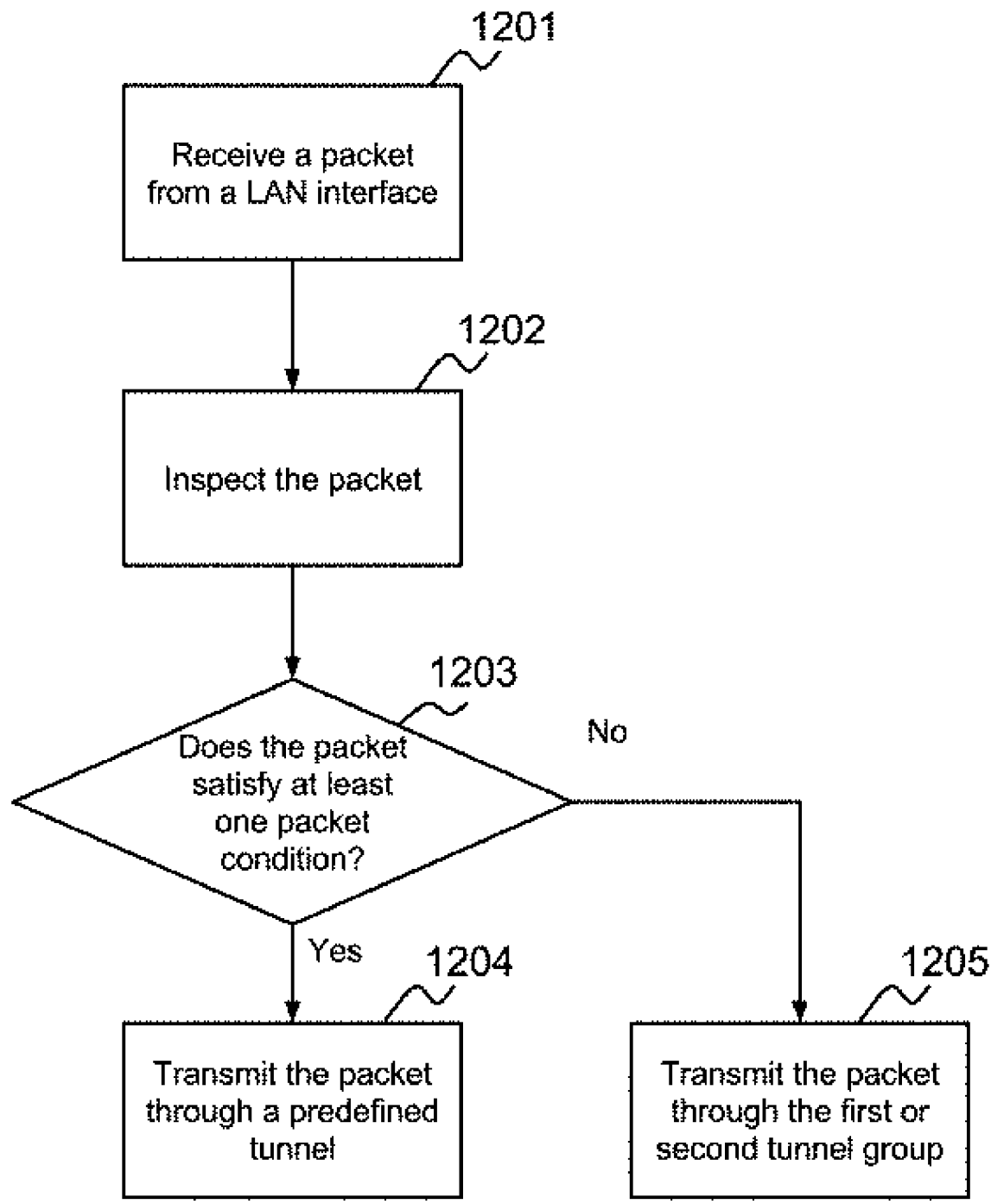
FIG. 12 is a flowchart illustrating a process for a first node to transmit and receive data to and from a second node according to one of the embodiments of the present invention.

FIG. 12 illustrates one of the embodiments according to the present invention. At step 1201, node 101 receives a packet from one of its LAN interface 122*a* or 122*b* and the packet is designated to a host that is reachable through node 102. The host may be located at a LAN connected to LAN interface 132 or may be located at Interconnected Networks 171 via WAN interface 131*c*.

At step 1202, the packet is inspected by an inspection logic. The inspection logic determines whether the packet satisfies at least one packet condition at step 1203. Inspection logic may include a software controlled microprocessor, a discrete logic (e.g., ASIC), an analog circuit, a digital circuit, a programmed logic device, a memory device containing instructions, and so on. The inspection logic may include one or more gates, combinations of gates, or other circuit components. Where multiple inspection logics are described, it may be possible to incorporate the multiple inspection logics into one physical logic. Similarly, it may be possible to distribute the inspection to multiple inspection logics. Those who are skilled in the art would appreciate that there are myriad ways to inspect a packet. For example, header of the packet is inspected by the inspection logic to determine the source address, the destination address, and/or protocol. The inspection may also be performed using deep packet inspection techniques to inspect payload of the packet.

After inspection, if the packet is found to satisfy at least one packet condition, processing unit 301 transmits the packet through a predefined tunnel at step 1204. If no packet condition is satisfied, processing unit 301 transmits the packet through one of the tunnels in the first tunnel group or the second tunnel group at step 1205. Between node 101 and node 102, there could be more than one predefined tunnel. A predefined tunnel is a tunnel that is predefined before the packet has been received by processing unit 301.

The packet conditions may be predefined and retrieved from a storage medium, such as main memory 302 or secondary storage 304, of node 101. There could be one or more packet conditions. For example, a packet condition is satisfied if the packet size is in a predefined range. In another example, a packet condition, can be based on a specific port number. For illustration purpose, the specific port number is 22. Such that when the packet has port number set to be 22, the packet has satisfied the packet condition. A packet condition is not restricted to be based on information in the IP header only. For example, a packet condition is satisfied at step 1203 when the packet is designated for a Session Initiation Protocol (SIP) phone located at a LAN connected to LAN interface 132 and the packet is a voice over IP (VoIP) packet. Then a predefined tunnel corresponding to the packet condition is used to transmit the VoIP packet at step 1204. As high latency may impact user experience negatively using the SIP phone, it is preferred to transmit the VoIP packet through a low-latency tunnel. Therefore, the predefined tunnel should be a low-latency tunnel. In this illustration, the predefined tunnel may be a unidirectional tunnel or a bidirectional tunnel.

In one variant, a packet condition may be based on the packet and other information. The other information is not correlated to the packet. For example, the other information may be time of a day, geographical location of the sender of the packet, geographical location of node 101, geographical location of node 102, network performance of one or more tunnels, and etc. For example, a packet condition is satisfied if a packet is originated from a video camera and the local time is between 07:00 a.m. to 07:00 p.m. Therefore, if the packet is originated from a video camera at 05:00 a.m., the packet condition is not satisfied at step 1203. On the other hand, if the packet is originated from a video camera at 09:00 a.m., the packet condition is satisfied at step 1203. When the packet condition is satisfied, a predefined tunnel corresponding to the packet condition is used to transmit the packet originating from the video camera at step 1204. As the video transmission is in general unidirectional, the predefined tunnel can be a unidirectional tunnel being carried through a satellite network. This does not limit the predefined tunnel to be a unidirectional tunnel. When there are limited resources, transmitting packets originating from the video camera through a unidirectional tunnel may save resources in other tunnels for other application use. As a result, a unidirectional tunnel is preferred for this video transmission.

The predefined tunnel is a tunnel used for transmitting the packet when the packet satisfies one of the packet conditions. The predefined tunnel is established before the packet is received in order to reduce the time to establish the predefined tunnel. The predefined tunnel may be a tunnel belonging to the first tunnel group, second tunnel group, or other tunnel groups. The predefined tunnel may also not belong to any tunnel group. It may be configured by the administrator of node 101 or by a server. In one variant, the predefined tunnel is one of the tunnel in an aggregated tunnel.

For example, the administrator may configure a predefined tunnel as a VPN connection using IPsec and L2TP for transmitting packets with real-time video content. In another example, the administrator may configure another predefined tunnel as a VPN connection using SSH tunnel protocol for transmitting packets originated from a particular source. In one variant, the predefined tunnel is also used by node 102 to transmit packets satisfying at least one of the conditions to node 101. For example, a predefined tunnel is configured for file transfer using SSH File Transfer Protocol (SFTP) for both node 101 and node 102. Therefore, when node 101 or node 102 inspects at step 1202 that a packet is being transmitted using SFTP, node 101 or node 102 will transmit the packet through the predefined tunnel to each other at step 1204.

In one variant, when the packet is inspected at step 1202 and determined to belong to a session that can tolerate high latency, the packet condition is satisfied at step 1203 and a corresponding high latency unidirectional tunnel is used to transmit the packet at step 1204. For example, as tunnel 201a is configured for transmitting data from node 102 to node 101 through satellite network 150 only, packets satisfying the packet condition will be transmitted through the unidirectional tunnel 201a from node 102 to node 101 at step 1204.

In another variant, a packet condition is satisfied if the packet belongs to a session that cannot tolerate high latency and a corresponding low latency bidirectional tunnel is used to transmit the packet. For example, if tunnel 201b is configured to be a bidirectional tunnel and has low latency for bidirectional packet transmission, tunnel 201b can be configured to be the corresponding predefined tunnel for a packet condition that is for packet with low latency requirement.

The administrator may configure a packet condition and the predefined tunnel corresponding to the packet condition at a node, such as node 101 and node 102. In one variant, the administrator may configure the packet condition and the predefined tunnel at a remote server and the remote server sends information of the packet condition and the predefined tunnel to the node. The administrator may configure a predefined tunnel to only be used for unidirectional packet transmission, for example, only to transmit packets from node 101 to node 102, but not from node 102 to node 101. Similarly, the administrator may configure a predefined tunnel to be used for bidirectional packet transmission, for example, to transmit packets from node 101 to node 102 and from node 102 to node 101.

In one particular embodiment, a predefined tunnel is configured with performance criterion/criteria and when performance of the predefined tunnel does not satisfy corresponding performance criterion/criteria, the predefined tunnel is no longer used as to transmit packets that satisfy the packet condition. Another tunnel may then be selected as the predefined tunnel. This ensures that packets satisfying the packet condition are transmitted through a predefined tunnel with desired performance. For example, node 101 has established three tunnels, namely tunnel A, tunnel B and tunnel C, with node 102. Tunnels A, B and C may belong to a first tunnel group, a second tunnel group, other tunnels group or no tunnel group. Tunnels A, B and C are aggregated together to form an aggregated connection. Tunnel A is configured to be the predefined tunnel for packets that are originated from a host connected to one of LAN interfaces of node 101. Tunnel A is a unidirectional tunnel that node 102 does not use it for transmitting packets to node 101. On the other hand, node 101 can transmit packets to node 102 through tunnel A. The performance criterion for tunnel A is that its latency cannot be larger than 200 ms. When a packet is originated from the host, designated for a host connected to node 102, and the latency of tunnel A is within 200 ms, the packet is transmitted by node 101 to node 102 through tunnel A. When latency of tunnel A is found to be more than 200 ms, tunnel A is no longer the predefined tunnel for the packets originated from the host and the packets may be transmitted by a backup predefined tunnel, or any of tunnels A, B or C. The performance criterion can be configured by the administrator or retrieved from a server.

In one variant, when tunnel A is no longer the predefined tunnel, tunnel B or tunnel C may be selected as the predefined tunnel if tunnel B or tunnel C satisfies the 200 ms latency requirement. If no tunnel satisfies the latency requirement, any of the tunnels A, B or C can be used to transmit the packets that satisfies the packet condition.

In one example, the administrator may input the configurations of the predefined tunnel through a Web interface. In one particular embodiment, the administrator is prompted to choose one of configured tunnels to be the predefined tunnel. The configured tunnels may belong to the first group of tunnels, the second group of tunnels or other groups. There is no limitation how the administrator has to input the configuration. In another example, the administrator my input the configuration through a console port.

Figure 13:
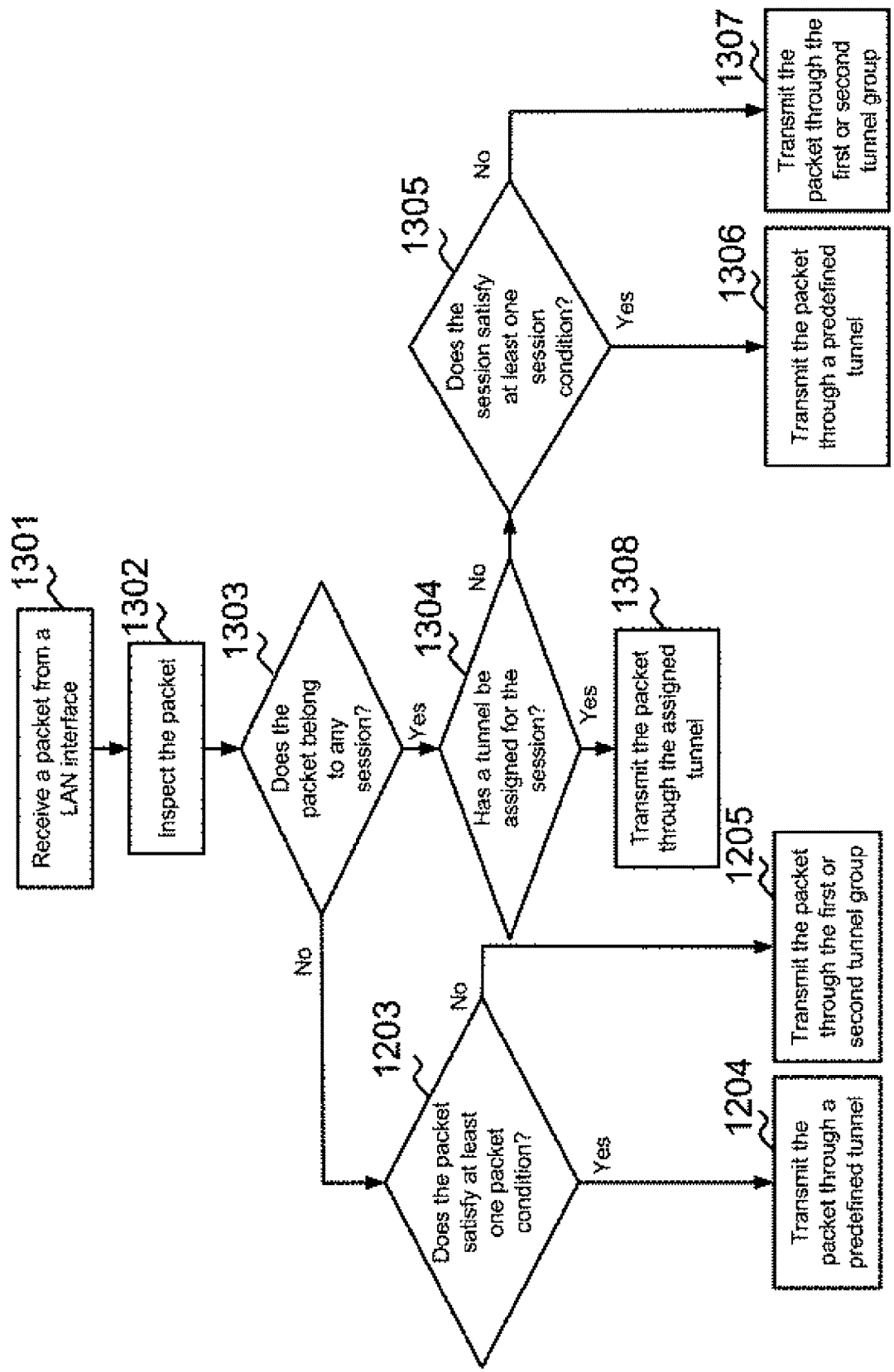
FIG. 13 is a flowchart illustrating a process for a first node to transmit and receive data to and from a second node according to one of the embodiments of the present invention.

FIG. 13 is a flowchart illustrating a process according to one of the embodiments according to the present invention. At step 1301, node 101 receives a packet from one of its LAN interfaces 122a and 122b, and the packet is destined to a host that is reachable through node 102. The host may be located at a LAN connected to LAN interface 132 or may be located at Interconnected Networks 171 via WAN interface 131. Steps 1203-1205 from the flowchart illustrated in FIG. 12 are incorporated in the flowchart in FIG. 13 as steps 1203-1205 are also used by this embodiment.

At step 1302, the packet is inspected by an inspection logic. The inspection logic provides the results for identifying a session that the packets belong to. Those who are skilled in the art would appreciate that there are myriad ways to determine a session that the packet belongs to by inspecting the packet. For example, TCP header of the packet is inspected by inspection logic to determine the source address, the destination address, protocol, and/or port number. The inspection may also be performed using deep packet inspection (DPI) techniques to inspect payload of the packet in order to determine the corresponding session. In another example, header of the packet is inspected by inspection logic to determine the session based on source address, the destination address, protocol, port number, and etc. For example, a session may be determined by the destination address and port number. The inspection may also be performed using DPI techniques to inspect payload of the packet. For example, by checking the port number in the TCP header session of the packet or by inspecting the data in the payload of the packet.

A packet may not belong to any session. For example, the packet is an Address Resolution Protocol (ARP) packet or Internet Control Message Protocol (ICMP) packet. A User Datagram Protocol (UDP) packet may or may not belong to a session. Although there may not be any session information in the header of UDP, those who are skilled in the art would appreciate that there are myriad ways to determine a session that an UDP packet belongs to by inspecting the source address, destination and/or port number. Those who are skilled in the art would also appreciate that contents in the payload of an UDP packet can be used to determine a session that the UDP packet belongs to. There is no restriction that a session is identified only by information in the header of the packet and/or in the header of TCP/UDP. DPI techniques can be employed to determine the session. At step 1303, if the packet is determined not to belong to any session, step 1203 will be performed.

If a packet belongs to a session, at step 1304, processing unit 301 determines whether a tunnel has already been assigned for the session. If a tunnel has already been assigned for the session, this implies that the packet is not one of the first packets belonging to the session received by node 101 and step 1305 has been already performed for the session. Therefore, there is no need to perform step 1305 again. This may save computing resources for performing the DPI and for making the decision at step 1305. The packet is then transmitted through the tunnel already assigned (assigned tunnel) at step 1308. The assigned tunnel can be a predefined tunnel, one or more tunnels of the first tunnel group, or one or more tunnels of the second tunnel group.

When there is no assigned tunnel for the session, step 1305 is performed to determine whether the session satisfies at least one session condition. The session condition used in step 1305 may or may not be the same as the packet conditions used in step 1203.

At step 1306, after inspection, if the session is found to satisfy at least one session condition, processing unit 301 assigns a predefined tunnel to transmit the packet. The predefined tunnel assigned now becomes the assigned tunnel for the session. Processing unit 301 saves the identity of the assigned tunnel in a storage medium, such as main memory 302 or secondary storage 304. Therefore, when future packets of the session are received, there is no need to perform step 1305 again and computing resources usage of node 101 may be reduce. As packets may arrive in high-speed, it is preferred to save the identity of the assigned tunnel in the cache of processing unit 301 or main memory 302 that can quickly be accessed by processing unit 301. If no session condition is satisfied, processing unit 301 transmits the packet through one of the tunnels in the first tunnel group or the second tunnel group at step 1307.

The predefined tunnel assigned at step 1306 may be the same as or may be different from the predefined tunnel used at step 1204. This allow the flexibility to distribute packets based on different criteria to different predefined tunnels. Similarly, the tunnel used to transmit packet at step 1307 may be the same as or may be different from the tunnel used to transmit packet at step 1205. For example, depending on tunnel availability and network performance, processing unit 301 may distribute a packet to a suitable tunnel at step 1307 and step 1205.

A session may start satisfying a session condition during the session. The session may also stop satisfying a session condition that the session used to satisfy. As a result, the assigned tunnel may no longer be valid. It is also possible that a different predefined tunnel should become the assigned tunnel used to transmit packets of the session. It is also possible that one or more tunnels of the first or second group should be used to transmit packets belonging to the session. Therefore, in one variant, step 1305 is performed periodically for a session in order to determine whether the session still satisfies at least one session conditions, and to determine which at least one session conditions the session satisfies.

In one variant, if an assigned tunnel is no longer valid, and a different predefined tunnel becomes a newly assigned tunnel, processing unit 301 may continue using the same assigned tunnel to transmit packets belonging to the session until the session has completed. Alternatively, processing unit 301 may use the newly assigned tunnel for transmitting packets belonging to the session and ceases using the previous assigned tunnel for transmitting packets belonging to the session.

In one variant, when node 101 has assigned a tunnel for a session, it sends a message to node 102 to instruct node 102 to use the same tunnel for transmitting packets from node 102 to node 101. This allows the same assigned tunnel to be used for both transmitting and receiving packets belonging to the session. In one variant, when node 101 has assigned a tunnel for a session, it sends a message to node 102 to instruct node 102 to use a different tunnel for transmitting packets from node 102 to node 101. Therefore the assigned tunnel for node 102 to transmit packets to node 101 for the same session is different. For example, node 101 may use tunnel 201a to transmit packets belonging to a FTP session to node 102 while receiving packets belong to the same FTP session through tunnel 201c. Concurrently, node 101 and node 102 may transmit real-time voice over IP packets to each other through tunnel 201d.

In one example, a session condition is satisfied when a session uses BitTorrent protocol. If node 101 downloads a file in a session using BitTorrent protocol, it may be preferred to use a unidirectional tunnel for the session in order to save resources in other tunnels for other application use. The unidirectional tunnel may only be used to receive packets at node 101 from node 102, and not vice versa. For example, tunnel 201d is a unidirectional tunnel with lowest priority, and therefore the predefined tunnel corresponding to the session using BitTorrent protocol is tunnel 201*d*. When there are priorities assigned to the tunnels according to performance of the tunnels, it may also be preferred to use a tunnel with lowest priority in order to save bandwidth resources for other tunnels. When it is determined in step 1304 that a tunnel has not been assigned to a session, and the session is determined to use BitTorrent protocol in step 1305, packets belonging to the session are transmitted using tunnel 201*d* at step 1306. In one variant, node 101 may use another tunnel transmit any packet belonging to the session to node 102, as tunnel 201*d* is configured to be unidirectional.

In another example, a session condition is satisfied when a session is used for screen sharing. For illustration purpose, host 103*b* is sharing a screen with a second host reachable through interconnected networks 172. Host 103*b* can establish a screen sharing session with the second host using one or more tunnels between nodes 101 and 102. When node 101 receives a packet belonging to the screen sharing session from host 103*b* through LAN interface 122*b*, and determines in step 1304 that a tunnel has not been assigned to the screen sharing session, node 101 determines whether the screen sharing session satisfies the session condition in step 1305. Node 101 determines that the screen sharing session does satisfy the session condition and hence transmits the packet through a predefined tunnel in step 1306. The predefined tunnel is preferred to be a unidirectional tunnel, as packets belonging to the screen sharing session are only being transmitted from node 101 to node 102, and not vice versa. Choosing a unidirectional tunnel to be the predefined tunnel corresponding to the session condition may save resources in other tunnels for other application use.

In one particular embodiment, an assigned tunnel is configured with performance criteria/criterion and when performance of the assigned tunnel does not conform to the performance criterion/criteria, the assigned tunnel is no longer used as to transmit packets that satisfy a session condition. Another tunnel may then be selected as the assigned tunnel. This ensures that packets satisfying the session condition are transmitted through an assigned tunnel with desired performance. For example, node 101 has established four tunnels, namely tunnel D, tunnel E tunnel F and tunnel G, with node 102. Tunnels D and E belong to a first tunnel group and Tunnels F and G belong to a second tunnel group. Tunnels D, E, F and G are aggregated together to form an aggregated connection. Tunnel D is configured to be the assigned tunnel for packets originated from sessions of surveillance cameras. There may be a plurality of surveillance cameras connected to node 102. Tunnel D may be a bidirectional tunnel. The performance criterion for tunnel D is that its packet drop rate cannot be larger than 20 in one second. When a packet is originated from a surveillance camera and belongs to a session and packet drop rate of tunnel D less than 20 in a second, the packet is transmitted through tunnel A. When packet drop rate of tunnel D is found to be more than 20 in a second, tunnel D is no longer the assigned tunnel for the packets originated from sessions of the surveillance cameras and the packets may be transmitted by a backup assigned tunnel, or any of tunnels D, E, F or G. The performance criteria can be configured by the administrator or retrieved from a server.

In one variant, when tunnel D is no longer the predefined tunnel, tunnels E, F or G may be selected as the predefined tunnel if tunnel E, F or G satisfies the packet drop requirement. If no tunnel satisfies the packet drop requirement, any of the tunnels D, E, F or G can be used to transmit the packets that satisfies the session condition.

The invention claimed is:

1. A method at a first node disposed in a network environment, comprising:
    (a) connecting to a plurality of cellular networks through a plurality of cellular modems;
    (b) establishing a plurality of tunnels with a second node through the plurality of cellular modems;
    (c) receiving packets through at least one local area network (LAN) interface of the first node;
    (d) inspecting each of the packets;
    (e) determining whether the each of the packets satisfies a respective condition in a plurality of conditions; and
    (f) when the each of the packets satisfies the respective condition: transmitting the each of the packets, based on the respective condition, through a respective tunnel in the plurality of tunnels;
    wherein:
        the plurality of tunnels comprises at least a first tunnel and a second tunnel;
        the first tunnel has a network latency different from a network latency of the second tunnel;
        the network latency of the first tunnel and the network latency of the second tunnel are determined based on an average, a maximum, a minimum, or other statistical calculations of latency observed for the first tunnel and the second tunnel;
        each condition in the plurality of conditions is based on at least one of: a coverage, a performance, a traffic congestion, and a latency sensitivity;
        the plurality of tunnels is aggregated to form one aggregated tunnel;
        the one aggregated tunnel is managed by using a tunnel management message;
        the tunnel management message comprises an identity field, an instruction field, and a status field;
        the identity field comprises an identity of the first tunnel and an identity of the second tunnel;
        the instruction field comprises information of which tunnel-group the first tunnel and the second tunnel belong to, and an indicator;
        the indicator indicates whether the first tunnel and the second tunnel are unidirectional or bidirectional; and
        the status field comprises information of a status of the first tunnel and a status of the second tunnel.

2. The method of claim 1, wherein the each of the packets is inspected at step (d) by using an inspection logic or a deep packet inspection technique.

3. The method of claim 1, wherein:
    the plurality of tunnels is grouped into at least two tunnel-groups;
    one tunnel-group in the at least two tunnel-groups is used to transmit the packets from the first node to the second node; and
    one tunnel-group in the at least two tunnel-groups is used to receive the different packets by the first node from the second node.

4. The method of claim 1, further comprising:
    selecting, based on at least one performance criterion, each tunnel in the plurality of tunnels to assign a respecting priority;
    wherein the respective tunnel in the plurality of tunnels used to transmit the packets at step (f) is assigned with a highest priority.

5. The method of claim 4, wherein the at least one performance criterion is selected from: a network latency, a response time, a packet delay, a bandwidth, a throughput, a packet loss, a packet drop, a power consumption, a signal-to-noise ratio, a round-trip time, an interference level, an error rate, a quality of service, a queuing delay, and a packet jitter.

6. The method of claim 1, further comprising:
receiving different packets from the second network node through a third tunnel in the plurality of tunnels.

7. The method of claim 6, wherein the third tunnel is established through a satellite.

8. The method of claim 6, wherein the third tunnel is established through a wireless communication technology.

9. The method of claim 1, further comprising:
using a fourth tunnel to transmit the packets;
wherein [NI the fourth tunnel is used when one tunnel in the plurality of tunnels fails.

10. A first node disposed in a network environment, the first node comprising:
a plurality of cellular modems;
at least one local area network (LAN) interface;
at least one processing unit;
at least one main memory; and
at least one non-transitory computer readable storage medium for storing program instructions executable by the at least one processing unit for:
(a) connecting to a plurality of cellular networks through the plurality of cellular modems;
(b) establishing a plurality of tunnels with a second node through the plurality of cellular modems;
(c) receiving packets through the at least one LAN interface;
(d) inspecting the packets;
(e) determining whether the each of the packets satisfies with a respective condition in a plurality of conditions; and
(f) when the each of the packets is satisfied with the respective condition:
transmitting the each of the packets, based on the respective condition, through a respective tunnel in the plurality of tunnels;
wherein:
the plurality of tunnels comprises at least a first tunnel and a second tunnel;
the first tunnel has a network latency different from a network latency of the second tunnel;
the network latency of the first tunnel and the network latency of the second tunnel are determined based on an average, a maximum, a minimum, or other statistical calculations of latency observed for the first tunnel and the second tunnel;
each condition in the plurality of conditions is based on at least one of: a coverage, a performance, a traffic congestion, and a latency sensitivity;
the plurality of tunnels is aggregated to form one aggregated tunnel;
the one aggregated tunnel is managed by using a tunnel management message;

the tunnel management message comprises an identity field, an instruction field, and a status field;
the identity field comprises an identity of the first tunnel and an identity of the second tunnel;
the instruction field comprises information of which tunnel-group the first tunnel and the second tunnel belong to, and an indicator;
the indicator indicates whether the first tunnel and the second tunnel are unidirectional or bidirectional; and
the status field comprises information of a status of the first tunnel and a status of the second tunnel.

11. The first node of claim 10, wherein the each of the packets is inspected at step (d) by using an inspection logic or a deep packet inspection technique.

12. The first node of claim 10, wherein:
the plurality of tunnels is grouped into at least two tunnel-groups;
one tunnel-group in the at least two tunnel-groups is used to transmit the packets from the first node to the second node; and
one tunnel-group in the at least two tunnel-groups is used to receive the different packets by the first node from the second node.

13. The first node of claim 10, wherein the at least one non-transitory computer readable storage medium further storing program instructions executable by the at least one processing unit for:
selecting, based on at least one performance criterion, each tunnel in the plurality of tunnels to assign a priority;
wherein the respective tunnel in the plurality of tunnels used to transmit the packets at step (f) is assigned with a highest priority.

14. The first node of claim 13, wherein the at least one performance criterion is selected from: a network latency, a response time, a packet delay, a bandwidth, a throughput, a packet loss, a packet drop, a power consumption, a signal-to-noise ratio, a round-trip time, an interference level, an error rate, a quality of service, a queuing delay, and a packet jitter.

15. The first node of claim 10, wherein the at least one non-transitory computer readable storage medium further storing program instructions executable by the at least one processing unit for:
receiving different packets from the second network node through a third tunnel in the plurality of tunnels.

16. The first node of claim 15, wherein the third tunnel is established through a satellite.

17. The first node of claim 15, wherein the third tunnel is established through a wireless communication technology.

18. The first node of claim 10, wherein the at least one non-transitory computer readable storage medium further storing program instructions executable by the at least one processing unit for:
using a fourth tunnel to transmit the packets;
wherein the fourth tunnel is used when one tunnel in the plurality of tunnels fails.

* * * * *